United States Patent [19]

Barrett et al.

[11] Patent Number: 4,753,265

[45] Date of Patent: Jun. 28, 1988

[54] DISPENSING SYSTEM

[76] Inventors: John P. Barrett, 879 Harbor Island, Clearwater, Fla. 33515; Daniel R. Schulz, P.O. Box 892, Crystal Beach, Fla. 33523; David E. Kent, Box 5286, Palm Harbor, Fla. 33635; Robert J. de Fasselle, 8603 Chardon Rd., Kirtland, Ohio 44094; Henry E. Zega, 2242 Jaffa Pl., Clearwater, Fla. 33546

[21] Appl. No.: 869,278

[22] Filed: Jun. 3, 1986

Related U.S. Application Data

[60] Division of Ser. No. 691,681, Jan. 14, 1985, Pat. No. 4,700,884, which is a continuation-in-part of Ser. No. 510,750, Jul. 5, 1983, Pat. No. 4,635,844, which is a division of Ser. No. 428,921, Sep. 30, 1982, Pat. No. 4,409,694.

[51] Int. Cl.$^4$ ............................................. F16K 11/07
[52] U.S. Cl. .................................... 137/554; 137/597; 137/625.4
[58] Field of Search ................... 137/597, 625, 625.48, 137/625.11, 625.13, 625.4, 625.41, 554

[56] References Cited

U.S. PATENT DOCUMENTS

| 1,391,676 | 9/1921 | Finley | 137/597 X |
|---|---|---|---|
| 2,011,329 | 8/1935 | Wayer | 251/76 |
| 2,693,826 | 11/1954 | Vaughan et al. | 137/625.4 X |
| 2,912,994 | 11/1959 | Mori | 137/625.4 X |
| 2,969,923 | 1/1961 | Fremion | 251/325 X |
| 3,162,210 | 12/1964 | Bemis | 137/597 X |
| 3,298,395 | 1/1967 | Lewis | 137/607 |
| 3,414,018 | 12/1968 | Eversman | 137/597 |
| 3,561,481 | 2/1971 | Tapin | 137/625.4 |
| 3,771,562 | 11/1973 | Curran | 137/625.4 |
| 3,859,619 | 1/1975 | Ishihara et al. | 137/554 X |

FOREIGN PATENT DOCUMENTS 84131 7/1983 European Pat. Off. ............ 137/597

Primary Examiner—Martin P. Schwadron
Assistant Examiner—Stephen M. Hepperle
Attorney, Agent, or Firm—Frijouf, Rust & Pyle

[57] ABSTRACT

A system is disclosed for dispensing a liquid at a desired temperature from a hot liquid pressure line and a cold liquid pressure line to a plurality of liquid outlets such as a bathtub, a sink or the like. The system controls the temperature of the liquid flowing from the plurality of liquid outputs as well as controlling the level of liquid within a container and for maintaining the temperature of the liquid therein. The system includes a liquid recycling system which reduces the amount of liquid discarded during the operation of the system and to conserve heat energy. The system is controlled by a novel electronic control which when applied to a water dispensing system is able to control all functions of a bathtub as well as being capable of controlling a sink, a toilet or the complete water system for a residence, a hotel, an industrial or medical complex or the like. The system also includes novel valve means for providing liquid mixing, liquid flow control, liquid distribution and diverting, liquid draining and liquid eduction which may be useful in many liquid distribution systems independent of the examples of the liquid dispensing system set forth herein.

8 Claims, 27 Drawing Sheets

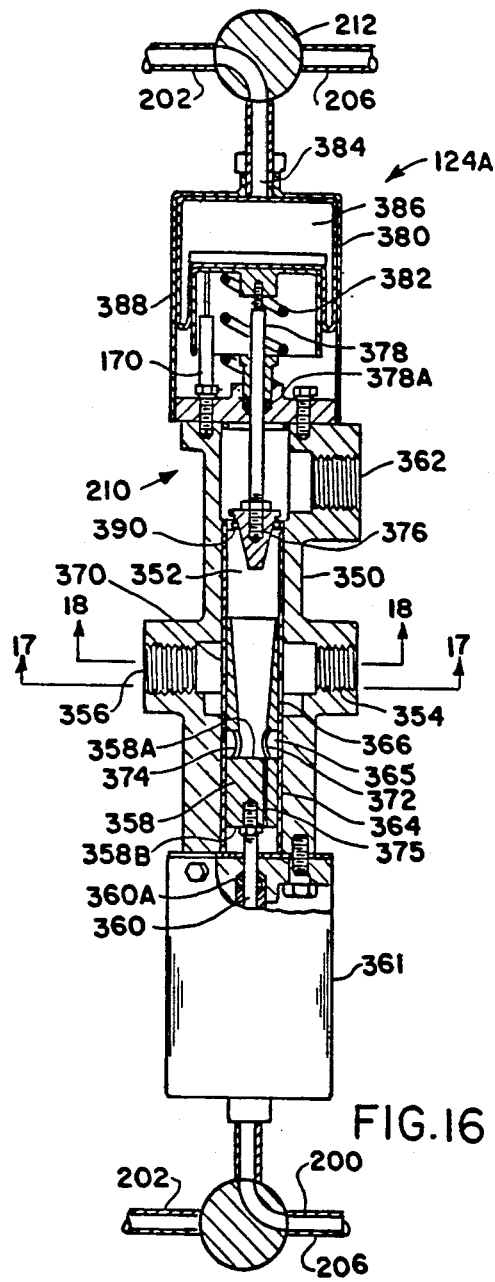
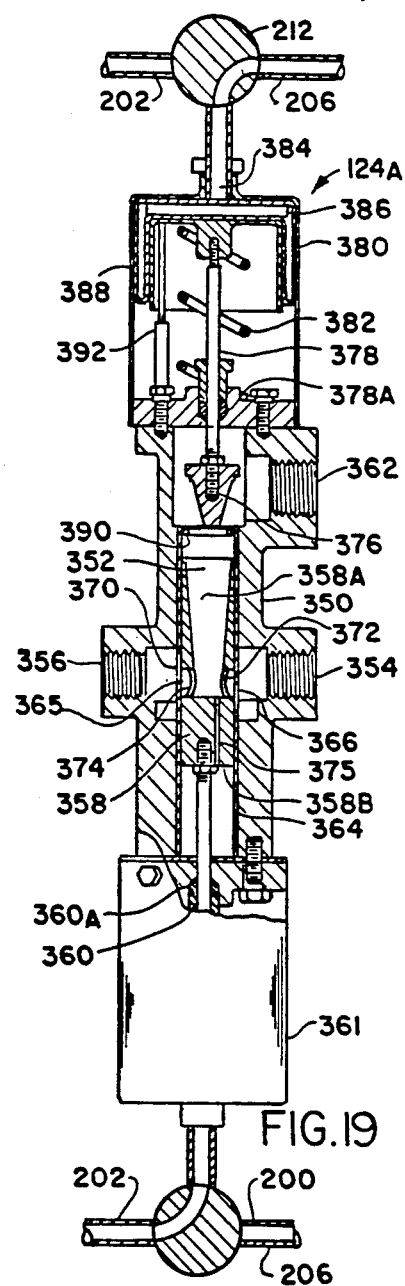
FIG. 16
FIG. 19
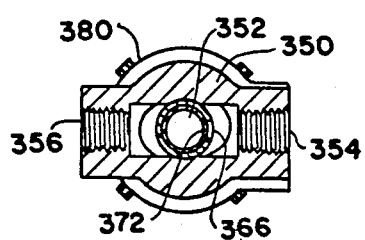
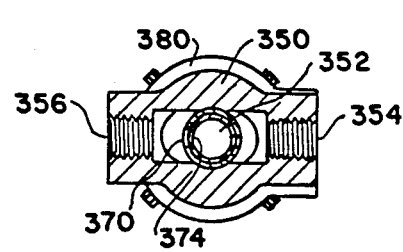
FIG. 17
FIG. 18

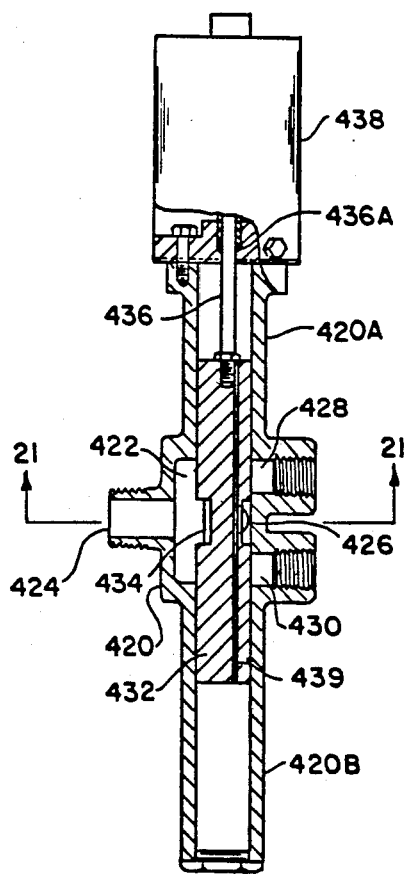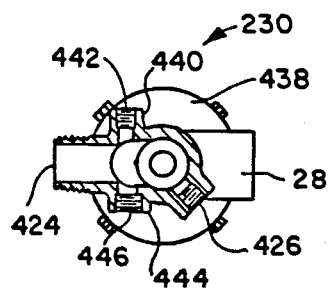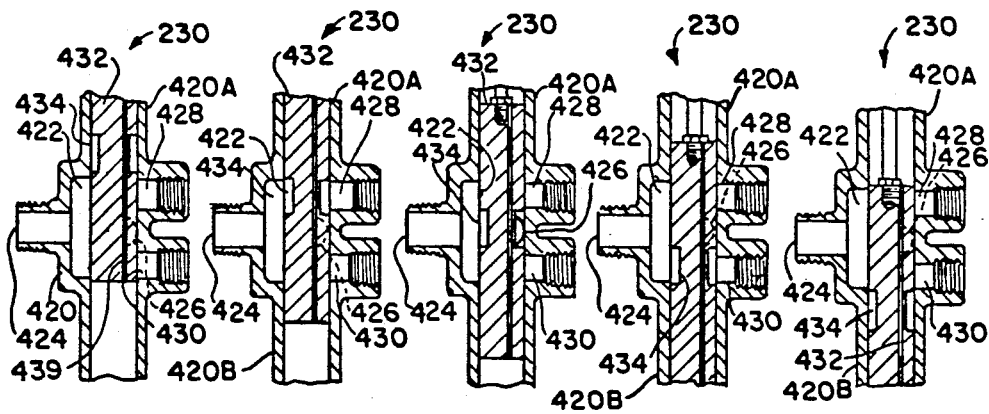
FIG. 20  FIG. 21
FIG. 22  FIG. 23  FIG. 24  FIG. 25  FIG. 26

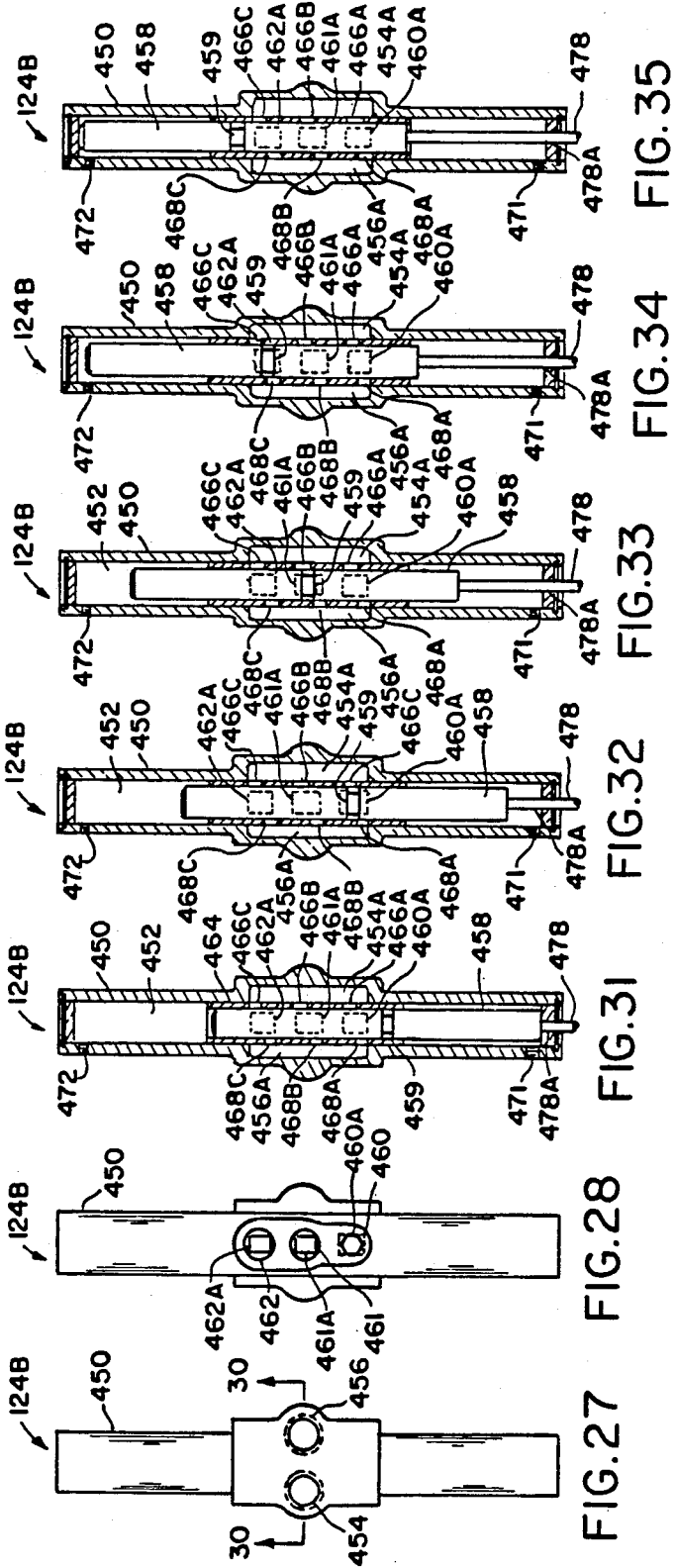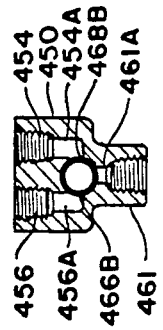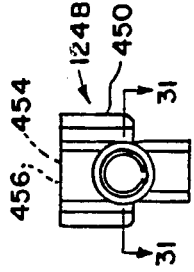

DISPENSING SYSTEM

CROSS REFERENCE TO RELATED APPLICATIONS

This is a division of application Ser. No. 691,681 filed Jan. 14, 1985, now U.S. Pat. No. 4,700,884, which is a continuation-in-part of application Ser. No. 510,750 filed July 5, 1983, now U.S. Pat. No. 4,635,844, which is a division of application Ser. No. 428,921 filed Sept. 30, 1982 now U.S. Pat. No. 4,409,694. All matter set forth in the aforementioned applications is hereby incorporated by reference into the present application.

BACKGROUND OF THE INVENTION

1. Field of the Invention

This invention relates to fluid dispensing and more particularly to a system for mixing a hot liquid with a cold liquid for dispensing the mixed liquids at a controlled temperature.

2. Description of the Prior Art

Various types of devices have been used for controlling the temperature of a liquid dispensed from a system. In addition, various types of liquid temperature controlling devices have found use in industrial, commercial residential and medical applications. One particular application for liquid temperature controlling devices is in the dispensing of water in bathtubs, sinks, showers and the like in homes, nursing homes, and medical complexes.

Historically, many types of baths and bathtubs have been manufactured which are well known to the prior art. The Romans were well advanced in engineering ingenuity as to the provision of various types of water systems including baths and waste water disposal devices. More recently, attention has turned to the manufacture of a bathtub that will not only enhance the ease with which an operator may take a bath or shower, but more particularly a need has existed in the art for controlling the temperature and flow functions of water within the bath, shower or a sink. In the past, it has been customary for a person desiring a bath to manually close the drain plug and manually open the hot and cold water faucets to the required setting to fill the bath with the requisite level of water at the desired temperature. When the water level had reached the required height, the faucets were closed and the bath was ready for use.

Although the foregoing system which should be well known to those skilled in the art have satisfied the needs for decades, certain problems have been experienced in carrying out the various operations of the prior art system as outlined hereinbefore. First, the process of bending over a bathtub to close the drain presents a serious problem for many elderly or infirm persons. Second, when a bath is to be filled and the hot water faucet is opened before the cold one, scalding can take place unless an incorrect setting is made to the hot and cold water faucets. Third, a period of time is normally required for the hot water to run at the faucet before the running hot water obtains the proper hot water temperature. While the hot water is running and being discharged to the drain, the water is being wasted in addition to wasting the energy required to heat the hot water which is at an elevated temperature but below the temperature desired by the operator. Fourth, if the flow of water from the open faucet is relatively slow, there exists a temptation to become involved with another task while the bath is running which may results in the waste of hot water due to overfilling or possibly the overflow of the bathtub if the faucets are not closed when the proper water level is reached in the bathtub. Fifth, there is no provision in a conventional bathtub to maintain the water in the bathtub at the desired temperature and at the desired water level.

Some in the prior art have developed various devices in an attempt to solve the problems in the prior art as heretofore described. Although these prior art devices have solved some of the specific needs of the liquid dispensing art, none of these prior art devices have contributed a total solution to the liquid dispensing art and specifically to water dispensing systems.

U.S. Pat. No. 2,001,329 to Wayer discloses a mixing valve for a faucet having a plurality of ports in a cylindrical valve casing in combination with a longitudinally movable piston for mixing a hot and a cold liquid.

U.S. Pat. No. 2,877,467 to Cloud illustrates a control system for controlling various functions of a bathroom which enables a bather to fill a bathtub to a required level with water at a desired temperature and to drain the tub after use by the bather. Unfortunately, this control system was expensive and overly complex and never obtained wide acceptance in the art.

U.S. Pat. No. 2,991,481 to Booke discloses an electronic control circuit for controlling the mixing of hot and cold water from a supply prior to flowing into a bathtub. Although this invention describes an overflow shut-off device for stopping the flow of water into the bathtub when the water level reaches an overflow condition, no disclosure is made of a selective control of the water level. Furthermore, no disclosure is made of a means for maintaining a preselected temperature of the water within the bathtub.

U.S. Pat. No. 2,991,482 to Brass, describes a side entry bathtub for aiding the entry of elderly or infirmed persons into a bathtub. The mechanism of this device is unfortunately overly complex and costly and subject to failure in a typical bathroom environment. In addition, the mechanism is not interrelated with a water dispensing system.

U.S. Pat. No. 2,969,923 to Fremion discloses a water mixing arrangement for a shower and a bath having a housing with a first and a second input port in combination with a hollow slide value to control the proportion of hot water and cold water entering the first and second input ports upon longitudinal movement of the slide valve.

U.S. Pat. No. 3,298,395 to Lewis shows a sequence valve for mixing a hot liquid and a cold liquid with the valve being powered by a hydraulic force operating on a flexible diaphram.

U.S. Pat. No. 3,561,481 to Taplin similarly illustrates a mixing valve powered by a hydraulic force for longitudinally moving a piston to control the flow rate of a first and a second liquid entering into the valve for mixing the first and the second liquids to discharge from a common outlet.

U.S. Pat. No. 3,771,562 to Curran discloses a three-way industrial valve suitable for both flow conveyance and flow divergence and adapted for use with pneumatic actuators.

U.S. Pat. No. 4,042,984 to Butler describes an automatic drain control and electronic circuit for controlling the quantity of water flowing into a bathtub. However, the quantity of water supplied is dependent on a clock controlled solenoid valve rather than the level of water within the bathtub. Unfortunately, in the event of an increase in water pressure, the quantity of water supplied to the bathtub would exceed the required quantity and may result in an overflow of the bathtub.

U.S. Pat. No. 4,202,060 to Touze discloses a bathtub having a sidewall access and a float controlled water level governing device.

U.S. Pat. No. 4,248,444 to Orszullok discloses a capacitive proximity switch for detecting the level of water within a bathtub.

U.S. Pat. No. 4,080,985 to Eagle, describes the operation of a float which slides within a tube to control the level of water entering a bathtub.

Numerous other devices have been proposed by the prior art for regulating the water level and temperature of washing machines and the like, but none of these devices is readily adaptable to a total liquid dispensing system which is adaptable to a residential, business or medical installation. Although some of the aforementioned patents have solve many of the needs of the prior art by providing liquid level controls and liquid temperature controls, none of the prior art devices teach a device which will selectively control the temperature and flow rate with which the liquid is delivered to a container, maintain the required temperature of liquid within the container and control the level of the liquid within the container in an efficient and economical manner which will permit mass installation of the system in residences, industries, medical complexes, nursing homes and the like.

In our prior U.S. Pat. No. 4,360,935, we disclosed a novel access door in a bathtub for enabling an elderly or an infirm person to readily enter and exit the bathtub without the need of stepping over the peripheral wall of the bathtub.

In another prior U.S. Pat. No. 4,409,694, we set forth a novel system comprising an electronic control and valve system for controlling the function of a bathtub including the temperature and the liquid level within the bathtub. This patent also disclosed many novel independent devices incorporated into the system.

The primary object of the present invention is to improve upon our prior inventions and to provide a system which controls the functions of a bathtub or sink or a complete water dispensing system which is superior in performance and versatility and which is more economical to produce, maintain and operate.

Another object of the present invention is the provision of a system for dispensing liquids having a novel liquid recirculation system which reclaims heated liquids that are under a desired temperature which would normally be discarded thus saving the liquid and the heat energy contained in the liquid.

Another object of the present invention is the provision of a system for dispensing liquids which automatically permits the liquid level to rise to a preselected level within a container and to maintain such level in the event that the volume of liquid is displaced by an object entering the container.

Another object of the present invention is the provision of a liquid dispensing system having an electronic control for regulating the bath and shower functions in a bathtub as well as regulating the water level and the water temperature in the bathtub.

Another object of the present invention is the provision of a liquid dispensing system suitable for use with a bathtub having a side access door which is particularly suitable for use by infirm or aged persons.

Another object of the present invention is the provision of a liquid dispensing system with an electronic control for a bathtub wherein the bathtub incorporates a side access door in which the open or the closed position of the bathtub access door is monitored by the electronic control and interrelated with the other functions of the bathtub.

Another object of the present invention is the provision of a liquid dispensing system having novel valve means for mixing hot liquid and cold liquid to dispense a mixture of the liquids at a preselected temperature.

Another object of the present invention is the provision of a liquid dispensing system wherein the novel valve means diverts liquid from the liquid outlet until the mixed obtains a preselected temperature whereat the liquid may be mixed and/or dispensed from the liquid outlet at a desired temperature.

Another object of the present invention is the provision of a liquid dispensing system wherein the novel valve means is selectable to direct the dispensed liquid to one of a plurality of liquid outputs.

Another object of the present invention is the provision of a liquid dispensing system wherein the novel valve means has a fail-safe operation to prevent accidental burning of a person in the remote event of malfunction of the dispensing system.

Another object of the present invention is the provision of a liquid dispensing system wherein the novel valve means is low cost and is applicable to bathtubs, sinks and the like as well as being applicable to industrial and medical applications.

Another object of the present invention is the provision of a liquid dispensing system wherein the novel valve means may be hydraulically operated from the hydraulic pressure of the liquid input conduit to the valve means resulting in a compact and efficient design and which is electrically isolated from an electronic circuit controlling the dispensing system.

Another object of the present invention is the provision of a liquid dispensing system wherein the electronic control system is programmable to enable independent or simultaneous control of a plurality of liquid outlets with each outlet having specific outlet requirement.

Another object of the present invention is the provision of a liquid dispensing system wherein the electronic control may control the simultaneous functions of multiple liquid outlets where each of the multiple liquid outlets has a different outlet requirement.

Another object of the present invention is the provision of a liquid dispensing system having a programmable electronic control which is capable of controlling the water dispensing requirements of an entire house or an entire building or a complex of buildings.

Another object of the present invention is the provision of a liquid dispensing system incorporating a single valve capable of mixing liquids and distributing the mixed liquids to one of a plurality of liquid outputs.

Another object of the present invention is the provision of a liquid dispensing system incorporating a novel bathtub inlet and water circulation system for maintaining the temperature of the water in the bathtub at a desired temperature.

Another object of the present invention is the provision of a liquid dispensing system having a novel water level sensor means for sensing the level of the water within the bathtub for providing input to the electronic control to maintain a preselected level of water in the bathtub.

Another object of the present invention is the provision of a liquid dispensing system having an electronic control which is programmable to enable the system to be readily adapted to different and varied types of installations and for readily modifying the function of the electronic control upon modification of the installation.

Another object of the present invention is the provision of a liquid dispensing system which may be installed in a conventional bathroom with a minimal amount of alterations with the system being formed of modular components which may be removed and replaced enabling rapid repair of the system in the remote event of a component failure.

Another object of the present invention is the provision of a liquid dispensing system having an electronic control which may be reprogrammed to readily modify the control function to accommodate for future expansion of the number of liquid outlets in the installation.

Another object of the present invention is the provision of a liquid dispensing system suitable for controlling the function of a toilet that flushes with pressurized water enabling a substantial savings of water relative to a conventional toilet.

Another object of the present invention is the provision of a liquid dispensing system which affords a degree of control and flexibility heretofore unknown in the art.

The foregoing has outlined some of the more pertinent objects of the present invention. These objects should be construed to be merely illustrative of some of the more prominent features and applications of the present invention. Many other beneficial results can be obtained by applying the disclosed invention in a different manner or modifying the invention within the scope of the disclosure. Although the invention is described with reference to a bathtub, sink and toilet, it should be appreciated by those skilled in the art that the invention may find application in industrial, commercial and medical installations and the like.

SUMMARY OF THE INVENTION

The invention is defined by the appended claims with a specific embodiment shown in the attached drawings. For the purpose of summarizing the invention, the invention may be incorporated in a system for dispensing a liquid at a desired temperature from a cold liquid pressure line and a hot liquid pressure line to a plurality of outlets. The invention comprises valve means for interconnecting the hot liquid pressure line and the cold liquid pressure line to the plurality of outlets. The valve means includes a mixing valve for mixing the hot liquid and the cold liquid from the hot liquid pressure line and the cold liquid pressure line. The valve means also includes a selector valve for directing the mixed hot and cold liquids to one of the plurality of outlets. The valve means has a divert position for diverting liquid from the hot liquid pressure line to a divert output. The system includes a control means for controlling the valve means to divert hot liquid into the divert outlet until the hot liquid obtains a preselected temperature and for mixing the hot liquid and the cold liquid to obtain a desired temperature and for directing the mixed liquid at the desired temperature to a selected one of the plurality of outlets. In some installations, it is desirable to have the valve means mix hot liquid from the hot liquid pressure line and cold liquid from the cold liquid pressure line and divert the mixture of the hot and cold liquids until the mixture obtains the desired temperature. It is also desirable in some installations to control the rate of flow of the output of the mixed hot and cold liquids to the plurality of outlets. The valve means may also comprise a liquid flow rate regulating valve for regulating the flow rate of the liquid emanating from the output of the valve means.

In another embodiment of the invention, the valve means includes a valve body having a longitudinally extending internal cavity. A first input is provided for introducing the first liquid into the internal cavity of the valve body. A second input is provided for introducing the second liquid into the internal cavity of the valve body. A diver output communicates with the internal cavity of the valve body for providing a fluid communication path between the first and second inputs and the divert output. A reciprocal valve plunger is disposed within the internal cavity of the valve body for enabling selective discharge of the first liquid and/or second liquid from the divert output when the reciprocal valve plunger is disposed in a divert position and for enabling proportional introduction of the first and second liquids into the internal cavity of the valve body from the first and second inputs when the reciprocal valve means is disposed between a first and a second position. A fluid output is in fluid communications with the internal cavity of the valve body for discharging the mixture of the first and second liquids from the fluid output of the internal cavity of the valve body.

In still a further embodiment of the present invention, a system is disclosed comprising a control circuit for a bathtub having a hot water conduit and a cold water conduit and a shower and a drain. The circuit comprises function switch means for selecting a bath function or a shower function. A lever switch means is provided for selecting the desired level of the water within the bathtub whereas a level sensor means determines the actual level of the water within the bathtub. A level comparator compares the output of the level switch means and the output of the level sensor means. A temperature switch means is included for selecting the desired temperature of the water discharged from the shower function or the bath function. Temperature memory means is contained within the control circuit for storing the value of the temperature selected by the temperature switch means. A mixing valve is connected to the hot water conduit and the cold water conduit for discharging the mixture thereof from the shower function or the bath function. A temperature sensor means senses the temperature of the mixture of the water emanating from the mixing valve. The control means interconnects the temperature switch means and the temperature memory means and the mixing valve for diverting mixed hot and cold water from the shower function and the bath function until the mixture of the hot and cold water obtains a preselected temperature relative to the temperature desired by an operator through the temperature switch means. The control means further is connected to the level comparator means for controlling the mixing valve to fill the bathtub with a mixture of hot water and cold water in accordance with the selected temperature stored in the temperature memory means and for simultaneously controlling a drain valve to remove water from the bathtub for maintaining the level of water in the bathtub in accordance with the output of the level switch comparator means.

In still a further embodiment of the invention, a liquid recovery device is disclosed for use in a system for dispensing liquid at a desired temperature to a liquid outlet from a cold liquid pressure line and hot liquid pressure line receiving hot liquid from a hot liquid reservoir. The recovery system includes valve means interconnecting the hot liquid pressure line and the cold liquid pressure line to the liquid outlet. The valve means is capable of mixing a hot liquid from the hot liquid pressure line and cold liquid from the cold liquid pressure line. The valve means has a divert output for diverting hot liquid and/or cold liquid to the divert output. A recovery means interconnects the divert output of the valve means to the hot liquid reservoir. Control means is provided for controlling the valve means to divert hot liquid and/or cold liquid into the divert output to be returned to the hot liquid reservoir until the hot liquid or the mixture of the hot and cold liquids obtains a preselected temperature and for directing the mixed hot and the cold liquid at a desired temperature to the liquid outlet.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures or carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 16 is a side view partially in section of the mixing and regulating valve means shown in FIG. 6 in an OFF condition;

FIG. 17 is a sectional view along line 17—17 in FIG. 16;

FIG. 18 is a sectional view along line 18—18 in FIG. 16;

FIG. 19 is a view similar to FIG. 16 with the mixing valve means shown in an ON condition;

FIG. 20 is a side view partially in section of the diverting and distribution valve of FIG. 6;

FIG. 21 is a sectional view along line 21—21 in FIG. 20;

FIG. 22 is a partial sectional view of the valve of FIG. 20 in an OFF position;

FIG. 23 is a partial sectional view of the valve of FIG. 20 in a bath function position;

FIG. 24 is a partial sectional view of the valve of FIG. 20 in a divert position;

FIG. 25 is a partial sectional view of the valve of FIG. 20 in a shower function position;

FIG. 26 is a partial sectional view of the valve of FIG. 20 in an OFF position;

FIG. 27 is an elevational view of the input side of the valve means of FIG. 7;

FIG. 28 is an elevational view of the output side of the valve means of FIG. 7;

FIG. 29 is a top view of the valve means of FIG. 27;

FIG. 30 is a sectional view along line 30—30 of FIG. 27;

FIG. 31 is a sectional view along line 31—31 of the valve of FIG. 27 in an OFF position;

FIG. 32 is a sectional view similar to FIG. 31 of the valve of FIG. 27 in a divert position;

FIG. 33 is a sectional view similar to FIG. 31 of the valve of FIG. 27 in a bath function position;

FIG. 34 is a sectional view similar to FIG. 31 of the valve of FIG. 27 in a shower function position;

FIG. 35 is a sectional view similar to FIG. 31 of the valve of FIG. 27 in an OFF position;

Similar reference characters refer to similar parts throughout the several views of the drawings.

DETAILED DISCUSSION

Figure 1:
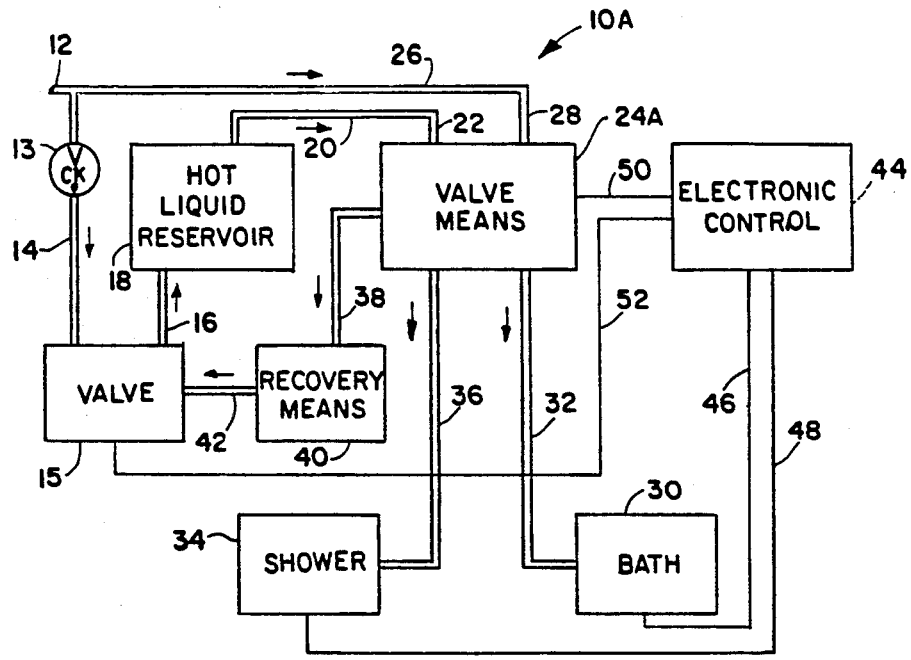
FIG. 1 is a block diagram of a first embodiment of a liquid dispensing system for dispensing a liquid at a desired temperature to a shower and a bath.

FIG. 1 illustrates a first embodiment 10A of a liquid dispensing system of the present invention applied to a bathtub having a shower function which may be a conventional shower head and a bath function for introducing water into a bathtub. The system 10A includes a cold liquid pressure line 12 which leads through a check valve 13 and a conduit 14 to a valve 15 connected by a conduit 16 to a hot liquid reservoir 18 which may be a conventional hot water heater tank. The output of the hot liquid reservoir 18 is applied by a conduit 20 to a hot liquid input 22 of a valve means 24A. The cold liquid line 12 is also connected by a conduit 26 to a cold liquid input 28 of the valve means 24A. The valve means 24A which will be described in greater detail hereinafter is capable of directing liquid at a desired temperature to either the bath function 30 by way of conduit 32 or the shower function 34 by way of conduit 36. In addition, the valve means 24A is capable of diverting liquid through a conduit 38 to a recovery means 40. The recovery means 40 is connected by a conduit 42 through valve 15 and conduit 16 to the hot liquid reservoir 18. An electronic control 44 receives sensory inputs from the bath function 30 and the shower function 34 by way of electrical conductor means 46 and 48 respectively to control the function of the valve means 24A, and the valve 15 through electrical conductors 50 and 52 respectively.

The basic function of the embodiment 10A as shown in FIG. 1 operates in a manner which will be briefly described herein and will be described in more detail hereinafter with reference to drawings showing the specific structure and operation of each of the blocks shown in FIG. 1. Cold liquid from the cold liquid line 12 enters through check valve 13 through valve 15 and conduit 16 to the hot liquid reservoir 18. The liquid in reservoir 18 is elevated to a desired temperature in a conventional manner. Upon activation of either the bath or the shower function 30 or 34 by an operator, the electronic control 44, energizes valve means 24A through electrical conductor 50 to allow liquid to flow from the hot liquid reservoir 18 into the hot liquid input 22 of valve means 24A. It should be appreciated by those skilled in the art that the valve means 24A may be located remote from the hot liquid reservoir 18 and accordingly the liquid within conduit 20 is of an elevated temperature but at a temperature which is insufficient for either the bath or the shower function 30 and 34. Accordingly, the valve means 24A will reclaim the liquid which is of insufficient temperature by diverting the liquid to the recovery means 40 until the liquid entering the hot liquid input 22 is at a temperature suitable for the shower function 34 or the bath function 30. When the temperature of the liquid entering the hot liquid input 22 obtains a preselected temperature, the electronic control 44 activates valve means 24A to mix the liquids entering the hot liquid input 22 and the cold liquid input 28 to a desired temperature and directs the mixture of the liquids to the desired shower function 34 or bath function 30 depending upon the selection of the user. Electronic control 44 continuously adjusts the valve means 24A to provide the proper proportion of hot liquid and cold liquid to produce a liquid at the desired temperature to either the shower function 34 or the bath function 30 irrespective of any changes in temperature of the liquids at the hot liquid input 22 or the cold liquid input 28.

For example, if a shower function 34 is required with a temperature of 95° F., the electronic control 44 will energize valve means 24A and draw hot liquid from the hot liquid reservoir 18. The valve means 24A will divert the liquid from conduit 20 through conduit 38 to the recovery means 40 until the liquid at the hot liquid input 22 obtains a preselected temperature which is at least 95° F. Thereafter, the the valve means 24A will direct liquid at a temperature of 95° F. through conduit 36 to the shower function 34. As the liquid entering the hot liquid input 22 increases above 95° F., the valve means 24A will mix the hot liquid entering the hot liquid input 22 with cold liquid entering the cold liquid input 28 to maintain the liquid discharged to conduit 36 at the desired 95° F. temperature. Accordingly, the system 10A will provide liquid at a desired temperature to either the shower function 34 or bath function 30 and will divert any liquid entering the hot liquid input which is at a temperature below a preselected or the desired temperature required by the user. Although the liquid in conduit 20 may be below the preselected or the desired temperature, the liquid still contains heat energy since the liquid is above the cold water temperature. Accordingly, the liquid which is diverted through conduit 38 to the recovery means 40 is recovered to firstly conserve the total amount of liquid used by the system and secondly to conserve the energy which the liquid contains by virtue of the liquid being at an elevated temperature relative to the ambient temperature of the cold liquid. The system 10A as shown and described in FIG. 1 may be enlarged to operate an entire bathroom, an entire house, an entire building, or a complex of buildings as will be made apparent hereinafter.

Figure 2:
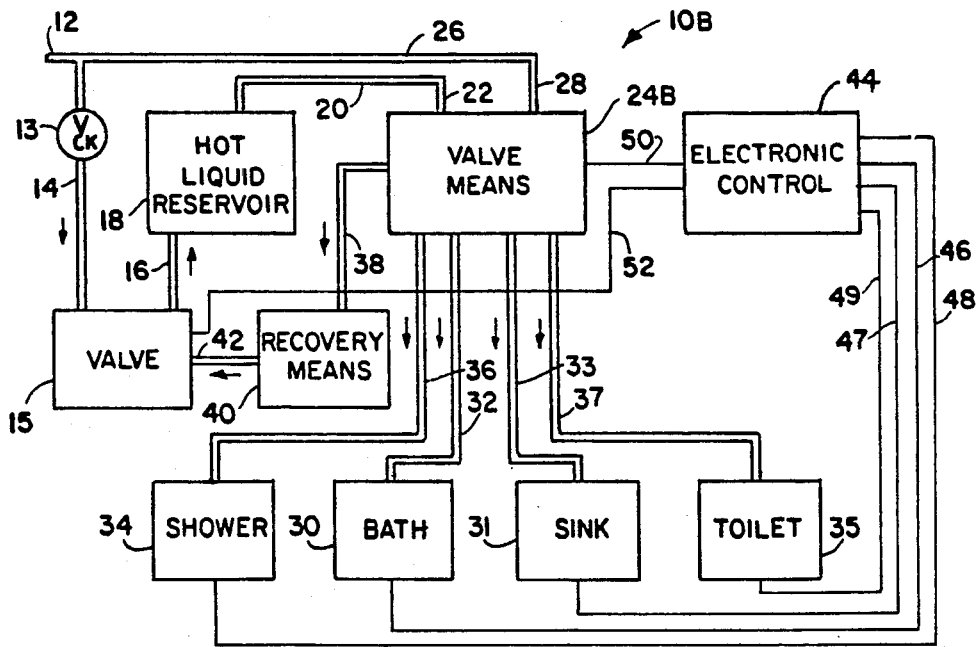
FIG. 2 is a block diagram of a second embodiment of a liquid dispensing system for dispensing a liquid at a desired temperature to a shower, bath, sink and toilet.

FIG. 2 illustrates a second embodiment of a liquid dispensing system 10B which is designed to control the function of an entire bathroom. In this embodiment, the cold liquid line 12 is applied through check valve 13, conduit 14, valve 15 and conduit 16 to the hot liquid reservoir 18. A valve means 24B has a hot liquid input 22 for receiving hot liquid from conduit 20 as well as a cold liquid input 28 for receiving cold liquid from conduit 26. The valve means 24B can divert liquid along conduit 38 to the recovery means 40 which is connected through conduit 42, valve 15 and conduit 16 to the hot liquid reservoir 18. The bath function 30 and the shower function 34 are connected to the valve means 24B by conduits 32 and 36 whereas a sink function 31 and a toilet function 35 connected by conduits 33 and 37 to the valve means 24B. Electrical conductors 46, 47, 48 and 49 interconnect the electronic control 44 with sensors of the bath function 30, the shower function 34, the sink function 31 and the toilet function 35, respectively.

The system 10B of FIG. 2 operates in a manner similar to the first system 10A shown in FIG. 1. However, the system 10B allows only one of the shower function 34, the bath function 30, the sink function 31 or the toilet function to be operated at a given time. The valve means 24B insures that only liquid of the proper temperature is directed to the function selected by the user. The shower function 34, the bath function 30 and the sink function 31 generally require the hot liquid to be mixed with the cold liquid to obtain the desired temperature selected by the user. The toilet function 35 generally requires a liquid only from the cold liquid input 12. Accordingly, the mixing operation of the valve means 24B is generally not operative with the toilet function 35.

Heretofore, most of the toilets of the prior art utilized a flush tank for holding a sufficient amount of water to properly flush solid material from a toilet. The present invention enables several unexpected and desirable results when the system is applied to a toilet. Firstly, the toilet may be of more modern design by virtue of the elimination of the toilet holding tank since the flushing action of the toilet will be effected by pressurized cold liquid. Secondly, the toilet may be redesigned to take advantage of a pressurized water flush thereby providing a superior flushing action along with a reduction of the total volume of water required to flush the toilet. Thirdly, the toilet may be provided with an option of flush cycles depending upon the content of the toilet. For example, if the content of the toilet is only liquid, a toilet will require less water to accomplish a proper flushing in contrast to a toilet having a solid content. In a conventional toilet, the same of amount of water is utilized for flushing irrespective of whether a liquid or a solid is present within the toilet. The present invention enables the user to have an opportunity as to the liquid volume used to flush the toilet depending upon whether the toilet contains a liquid or a solid content. Accordingly, the incorporation of the present invention into a bathroom will result in a substantial savings of water.

Figure 3:
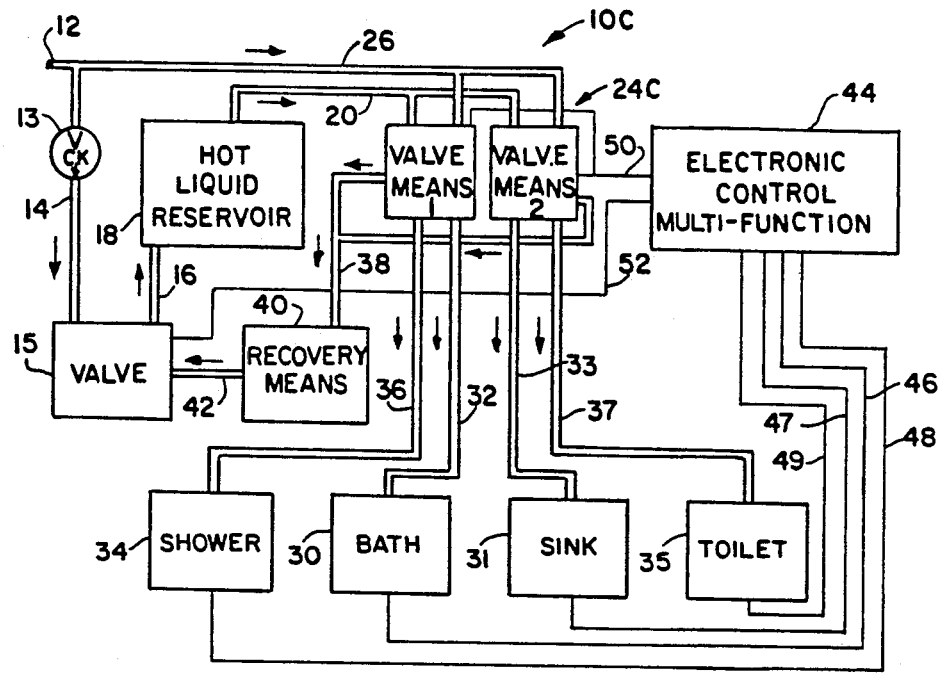
FIG. 3 is a block diagram of a third embodiment of a liquid dispensing system similar to FIG. 2 for enabling the simultaneous use of the shower, bath, sink and toilet.

FIG. 3 illustrates a third liquid dispensing system 10C similar to the embodiment 10B heretofore described. In this embodiment, the shower function 34, the bath function 30, the sink function 31 and the toilet function 35 may be operated simultaneously and independently with the incorporation of an enhanced valve means 24C shown as valve means 1 and valve means 2 and a multi-function electronic control 44. As will become apparent hereinafter with the explanation of the electronic control 44, the electronic control 44 is software controlled and programmable. Accordingly, the electronic control 44 may be readily reprogrammed to accommodate for various functions and systems depending upon the particular type of the liquid distribution system and the particular type of valve means incorporated into the system. In the system shown in FIG. 3, the electronic control 44 senses the conditions of each of the shower function 34, the bath function 30, the sink function 31 and the toilet function 35 and the user requirements thereof and provides liquid at the proper temperature to the function selected by the user irrespective of the use of the other functions.

Figure 4:
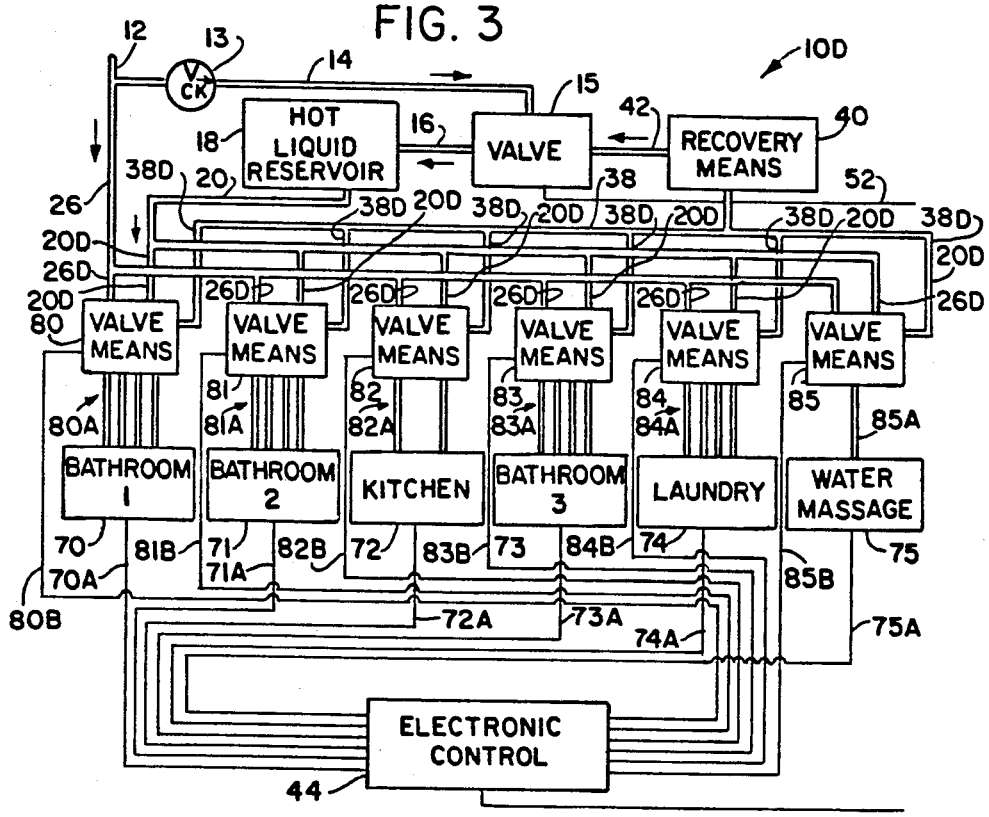
FIG. 4 is a block diagram of a fourth embodiment of liquid dispensing system for dispensing liquid at a desired temperature shown incorporated into a multiroom residential home.

FIG. 4 illustrates a fourth embodiment of a liquid dispensing system 10 D, wherein the system is employed to control the complete liquid distribution in a residential house. It should be appreciated that the system 10D may be suitable for use with a commercial or medical building or a complex of buildings with the addition of a more enhanced valve means and a reprogramed electronic control 44. However, for the sake of simplicity, the more complex systems involving multiple buildings have not been set forth herein since such systems are considered within the scope of the present invention and disclosure.

The system 10D shown in FIG. 4 illustrates a house having a plurality of liquid receiving rooms shown as a first bathroom 70, a second bathroom 71, a kitchen 72, a third bathroom 73, a laundry 74 and a water massage 75. The bathroom 70, 71 and 73 may each be similar to the arrangement shown in FIG. 3. The liquid receiving rooms 70 - 75 have a corresponding valve means 80 - 85 respectively interconnected by a single or a plurality of conduits shown collectively as 80A - 85A. The valve means 80 - 85 receive cold liquid by conduit 26 and distrubution conduits 26D and receive hot liquid from the hot liquid reservoir 18 by conduit 20 and distribution conduits 20D. Similarly, the valve means 80 - 85 have conduit 38D for connection to conduit 38 to divert liquid to the recovery means 40. The valve means 80 - 85 receive electrical control signals from electronic control 44 on electrical conductors 80B - 85B with conductors 70A - 75A sensing the condition of the various operating elements in the water receiving room 70 - 75. It should be appreciated by those skilled in the art that the electrical connectors 80B - 85B and 70A -75A have been shown as single conductors for the sake of simplicity but the electrical conductors may include multiple connectors depending upon the particular electronic circuit.

The fourth system 10D operates in manner similar to the embodiments heretofore described. Upon desiring to use a certain function in one of the liquid receiving rooms, the user energizes a control which is sensed by the electronic control 44 which activates the respective valve means for providing the required function. All liquid diverted from valve means 80 - 85 is directed through the recovery means 40 and valve 15 to be returnend to the hot liquid reservoir 18 by conduits 42 and 16. The electronic control 44 in embodiment 10D, is able to operate all of the functions within the system simultaneously without interference with one another. However, only a single electronic control 44 in a reprogramed format is required for the enhanced system 10D. Although the recovery means has been shown as a single recovery means 40 several recovery means may be located at different locations within the building structure depending upon the convenience of installation.

The system as set forth herein provides an economical means for controlling the entire liquid distribution in a residental house with the use of a single electronic control 44. It should be appreciated by those skilled in the art that each of the water receiving rooms 70 - 75 may be expanded within the teaching of the present specificaton to be representative of different floors of a building or to be representative of separate buildings of a complex of buildings, all being controlled by a single electronic controller.

Figure 5:
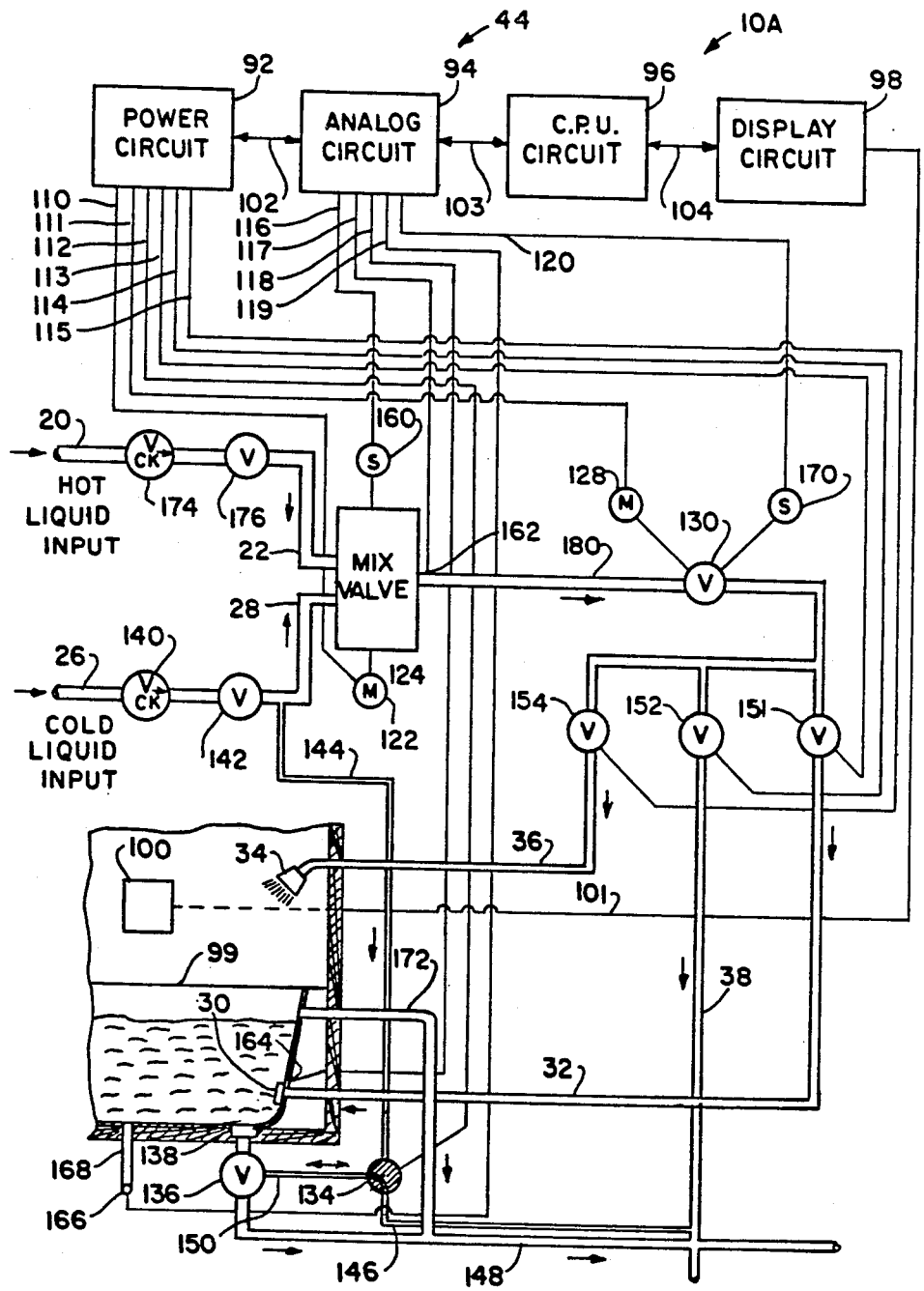
FIG. 5 is a diagram showing in more detail the liquid dispensing system of FIG. 1 utilizing a first valve means.
Figure 11:
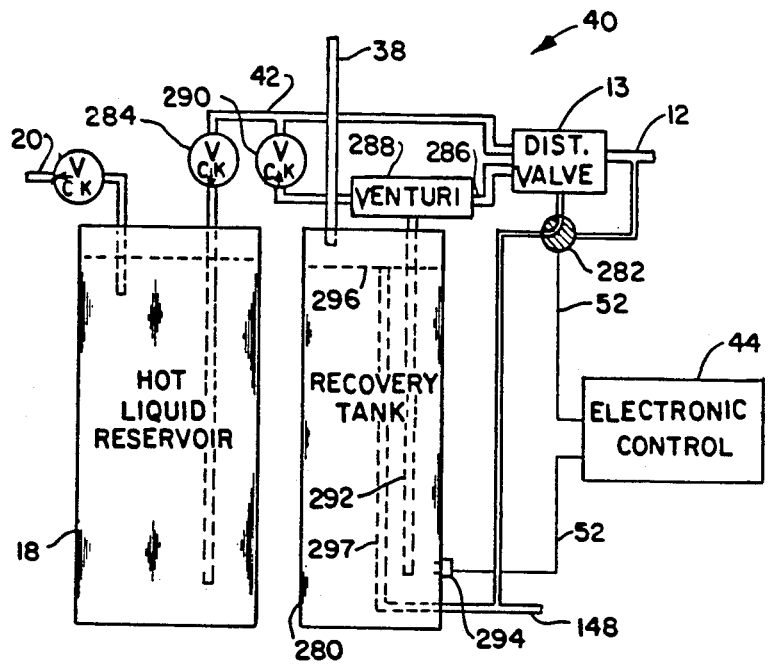
FIG. 11 is a detailed view of a first embodiment of a recovery means shown in FIGS. 1-4 for recovering diverted below temperature liquid.
Figure 12:
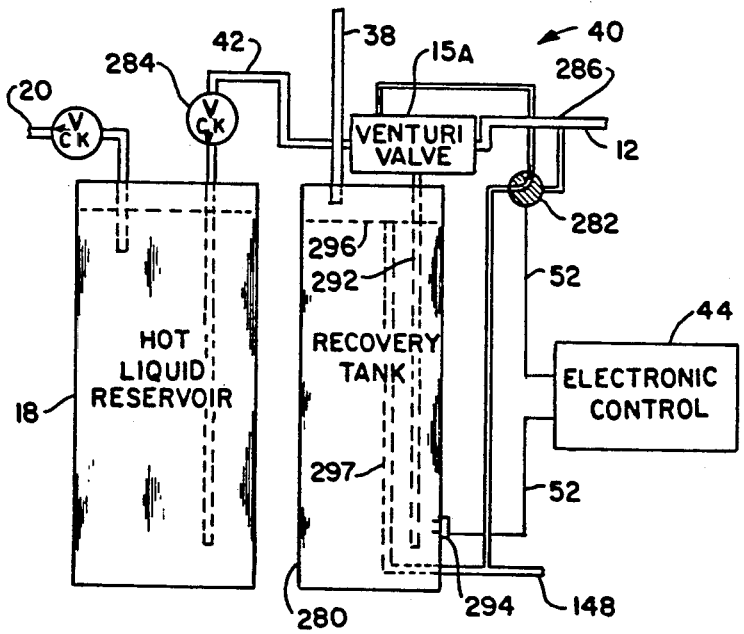
FIG. 12 is a detailed view of a second embodiment of the recovery means shown in FIGS. 1-4 for recovering diverted below temperature water.

FIG. 5 is more detailed view of the system shown in FIG. 1 but for the sake of simplicity the liquid recovery means 40 has not been included but has been shown separately in FIGS. 11 and 12. The electronic control 44 is illustrated comprising a power circuit 92, an analog circuit 94, a central processing unit (CPU) 96 and a display circuit 98. An input and display unit 100 is located at the bathtub 99 proximate the bath function 30 and the shower function 34 and is connected to the display circuit 98 by a conductor 101. The circuits 92, 94, 96 and 98 are interconnected by electrical conductors illustrated as single conductors 102, 103, and 104. The electrical conductors 101, 102, 103, and 104 are shown as single conductors but it should be understood that these conductors may be plural conductors for transferring electrical information between the circuits.

The power circuit 92 provides control power through electrical conductors 110 - 115 for activating various functions of the system whereas the analog circuit 94 receives input information from the various sensors in the system along conductors 116 - 120. Conductor 110 is connected to a motor 122 for controlling the position of mixing valve 124. Conductor 111 is connected to motor 128 for controlling the position of a flow rate control valve 130. Conductor 112 is connected for controlling a three-way valve 134 for controlling the operation of a hydraulically operated drain valve 136 for a drain 138 of bathtub 99. The hydraulically operated drain valve 136 receiving pressurized cold water from the cold liquid input 26 through a check valve 140 and a shut off valve 142 along a conduit 144 to valve 134. A conduit 146 interconnects valve 134 to the recovery means 40 through conduit 38. When the power circuit 92 moves valve 134 into the position opposite to that shown in FIG. 5, liquid under pressure moves through conduit 144 and interconnecting conduit 150 to activate valve 136 into a closed position to close the bathtub drain 138. When the power circuit 92 moves valve 134 to the position as shown in FIG. 5, the liquid under pressure in hydraulically operated valve 136 flows through interconnecting conduit 150 and conduit 146 thereby opening the drain 138 and allowing water within the bathtub 99 to flow to drain conduit 148 connected through a conventional trap (not shown) to a conventional drain line. Valve 134 may be a solenoid operated three way valve or may be a motorized valve depending upon a particular application.

Conductor 113 is connected for controlling the ON-OFF condition of valve 151 located in fluid communication with conduit 32 to control liquid to the bath function 30. Conductor 114 is connected for controlling the ON-OFF condition of divert valve 152 connected to the recovery means by conduit 38. Conductor 115 is connected for controlling the ON-OFF function of valve 154 located in fluid communication with conduit 36 for controlling the shower function 34.

The analog circuit 94 receives electrical input from various sensors to process information to the CPU 96 of the actual status of the system 10A. Connector 116 is connected to a sensor 160 for sensing the position of mixing valve 124. Connector 117 is connected to a temperature sensor 162 for sensing the temperature of liquid emanating for the mixing valve 124. Connector 118 is connected to a temperature sensor 164 at the outlet of the bath function 30 for sensing the temperature of the liquid in the bathtub 99. Electrical connector 119 is connected to a pressure sensor 166 located in a well 168 disposed at the bottom portion of the bathtub 99 for sensing the level of liquid internal the bathtub 99. The temperature sensor 164 and pressure sensor 166 will be discussed in more detail hereinafter with reference to FIGS. 13-15. Electrical conductor 120 is connected to a position sensor 170 for sensing the position of the the flow rate or regulator valve 130. The bathtub 99 also includes a conventional overflow drain 172 interconnected to drain 148 as should be well known to those skilled in the art.

The hot liquid input conduit 20 is passed through a check valve 174 and a shut-off valve 176 connected to the hot liquid input 22 of valve 124. The cold liquid input conduit 26 is similarly connected to the cold liquid input 28 of mixing valve 124. The output is connected by a conduit 180 through regulator valve 130 to valves 151, 152 and 154.

In this embodiment, valve 124, 130, 151, 152 and 154 comprise the valve means 24A shown in FIG. 1. Valve 124 provides a mixing function of the hot and cold liquids with valve 130 providing flow regulation and an ON-OFF function of the mixed liquids emanating from conduit 180 mixing valve 124. Valves 150, 152 and 154 function to distribute the mixed liquids to either the recovery means 40 shown in FIG. 1 through conduit 38, or to the shower function 34 through conduit 36 or to the bath function 30 through conduit 32. The example shown in FIG. 5 illustrates the use of conventionally available valves which may be interconnected as shown in FIG. 5 to provide the new result of the present invention.

Figure 6:
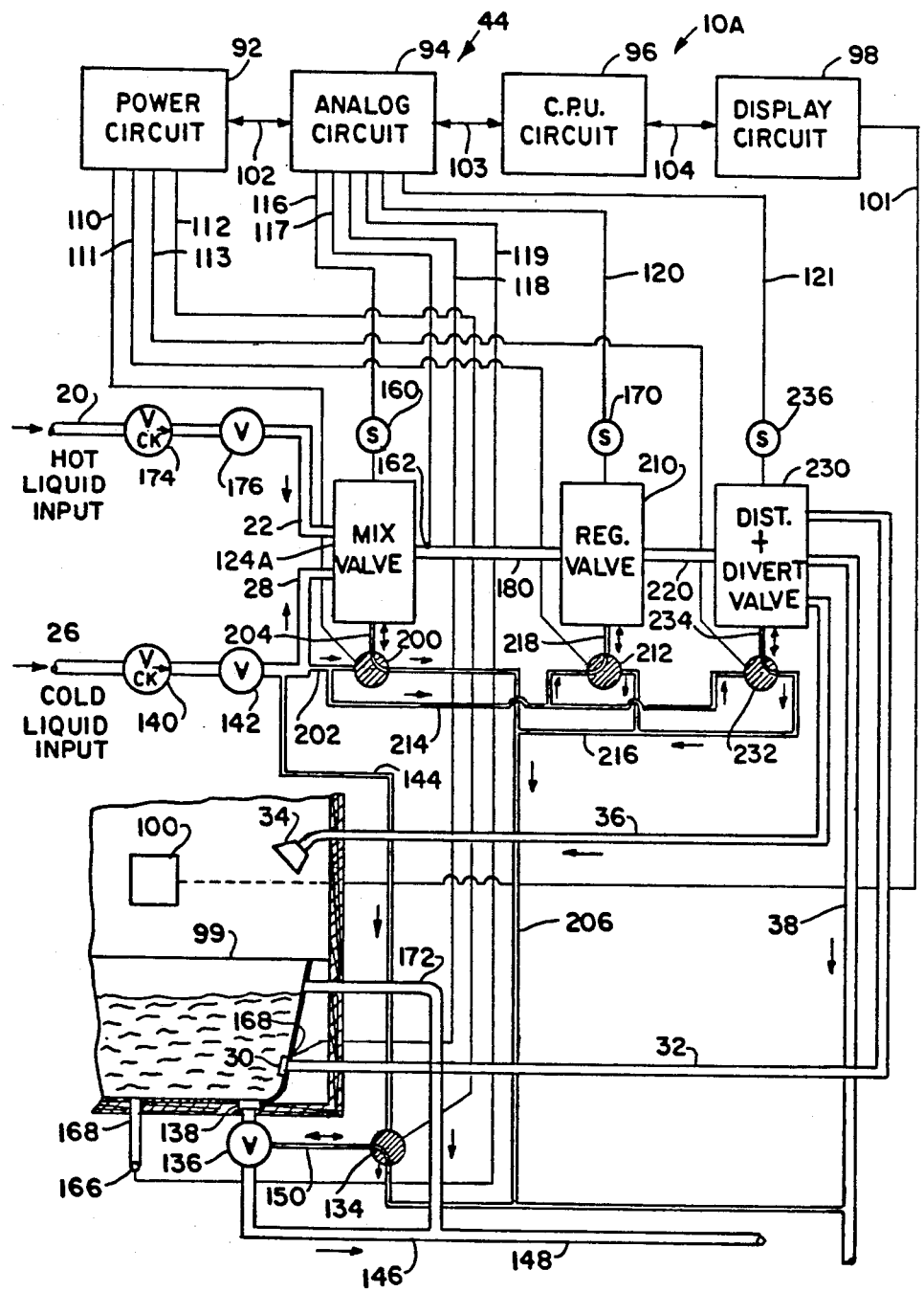
FIG. 6 is a diagram showing in more detail the liquid dispensing system of FIG. 1 utilizing a second valve means.

FIG. 6 is an alternative embodiment of the system 10A shown in FIG. 1 which incorporates novel valve means for simplifying the interconnection of the various functions in accordance with the present invention. In this embodiment, the mixing valve 124A is hydraulically operated by a three-way valve 200 controlled by the power circuit 92 through conductor 110 in a manner similar to valve 124 of FIG. 5. When valve 200 is in the position opposite to the position shown in FIG. 6, liquid under pressure from conduit 202 is directed through conduit 204 to move a valving element within the mix valve 124A. When valve 200 is moved by the power circuit 92 to a position as shown in FIG. 6 liquid is discharged from mixing valve 124A by spring pressure within the valve 124A through conduit 204 to conduit 206 to discharge to the recovery means 40 through conduit 38. The conduit 180 of mixing valve 124A is connected to a hydraulically controlled regulator valve 210 controlled by a three-way valve 212 driven by the power circuit 92 by conductor 111. Three-way valve 212 receives fluid pressure from conduit 214 and discharges fluid pressure through conduit 216 to operate regulator valve 210 along conduit 218. The output of regulator valve 210 is connected by conduit 220 to a hydraulically operated distribution and diverting valve 230. The distribution and diverting valve 230 is hydraulically operated by a three-way valve 232 driven by power circuit 92 along conductor 113. A three-way valve 232 receives fluid pressure from conduit 214 an discharges fluid pressure through conduit 216 to operate distribution valve 230 along conduit 234. A position sensor 236 is connected by electrical connector 121 to the analog circuit 94 in a manner similar to sensor 170.

The output of distributon valve 230 communicates with the recovery means 40 (not shown) through conduit 38 in addition to communicating with the bath function 30 and the shower function 34.

The general operation of the systems of FIG. 6 has been described herein with reference to FIGS. 1, 5 and 6. The specific operation of valves 124A, 210 and 230 will be explained in greater detail with reference to FIGS. 16–26. The control valves 200, 212 and 232 are shown as rotatable three-way valves but it should be understood that various types of valves including solenoid operating valves and the like may be utilized to provide the desired function to provide hydraulic pressure to the mixing valve 124A, the regulation valve 210 and the distribution valve 230. With the incorporation of the novel mixing valve 124A, the regulating valve 210 and the distribution valve 230, the electrical circuitry is minimized and the complexity of liquid conduits is reduced from the system shown in FIG. 5.

Figure 7:
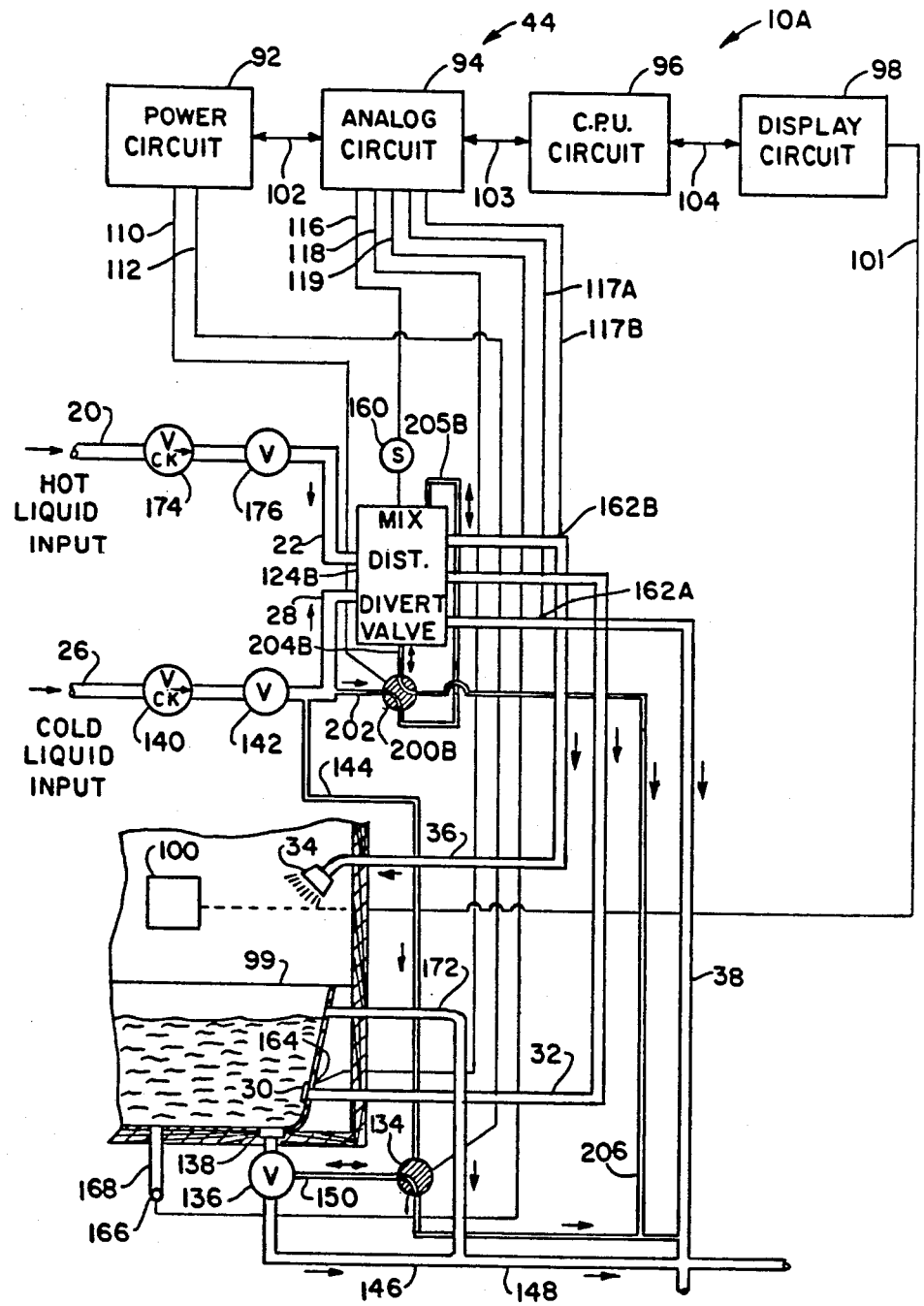
FIG. 7 is a diagram showing in more detail the liquid dispensing system of FIG. 1 utilizing a third valve means.

FIG. 7 is a further variation of the system 10A shown in FIG. 1 incorporating a further refinement to the valve means for providing mixing, distribution to the bath function 30, the shower function 34 and the divert function. The mixing, distribution and divert valve 124B has the advantage of requiring only a single valving element but due to the simplicity of the valving element, flow regulation is unavailable in this valve and must be pre-established for the particular installation. Accordingly, the shower function 34 will only have a single pressure level which is non-selectable by the operator. In addition and in contrast to the hydraulically operated valve 124A of FIG. 6, the valve 124B utilizes a hydraulic return rather than a spring return. The valve 124B is hydraulically operated by a four-way valve 200B driven by power circuit 92 along conductor 110. The four-way valve 200B receives fluid pressure from conduit 202 and discharges fluid pressure through conduit 206 to operate valve 200B through a differential in fluid pressure in conduits 204B and 205B. A greater fluid pressure in conduit 204B relative to conduit 205B will cause a movement of a valve element in valve 124B in a first direction whereas a greater fluid pressure in conduit 205B relative to conduit 204B will cause a movement of the valve element in valve 124B in a second direction. The outputs of valve 124B communicate with the recovery means 40 (not shown) through conduit 38 in addition to communicating with the bath function 30 and the shower function 34. In this embodiment, the analog circuit 94 receives signals on connectors 117A and 117B from temperature sensors 162A and 162B disposed on conduits 38, and 36 respectively. As it can be seen from FIG. 7, valve 124B further simplifies the electrical and liquid interconnection of the system as compared to FIGS. 5 and 6. The specific embodiment of valve 124B for accomplishing this result is set forth hereinafter with reference to FIGS. 27–35.

Figure 8:
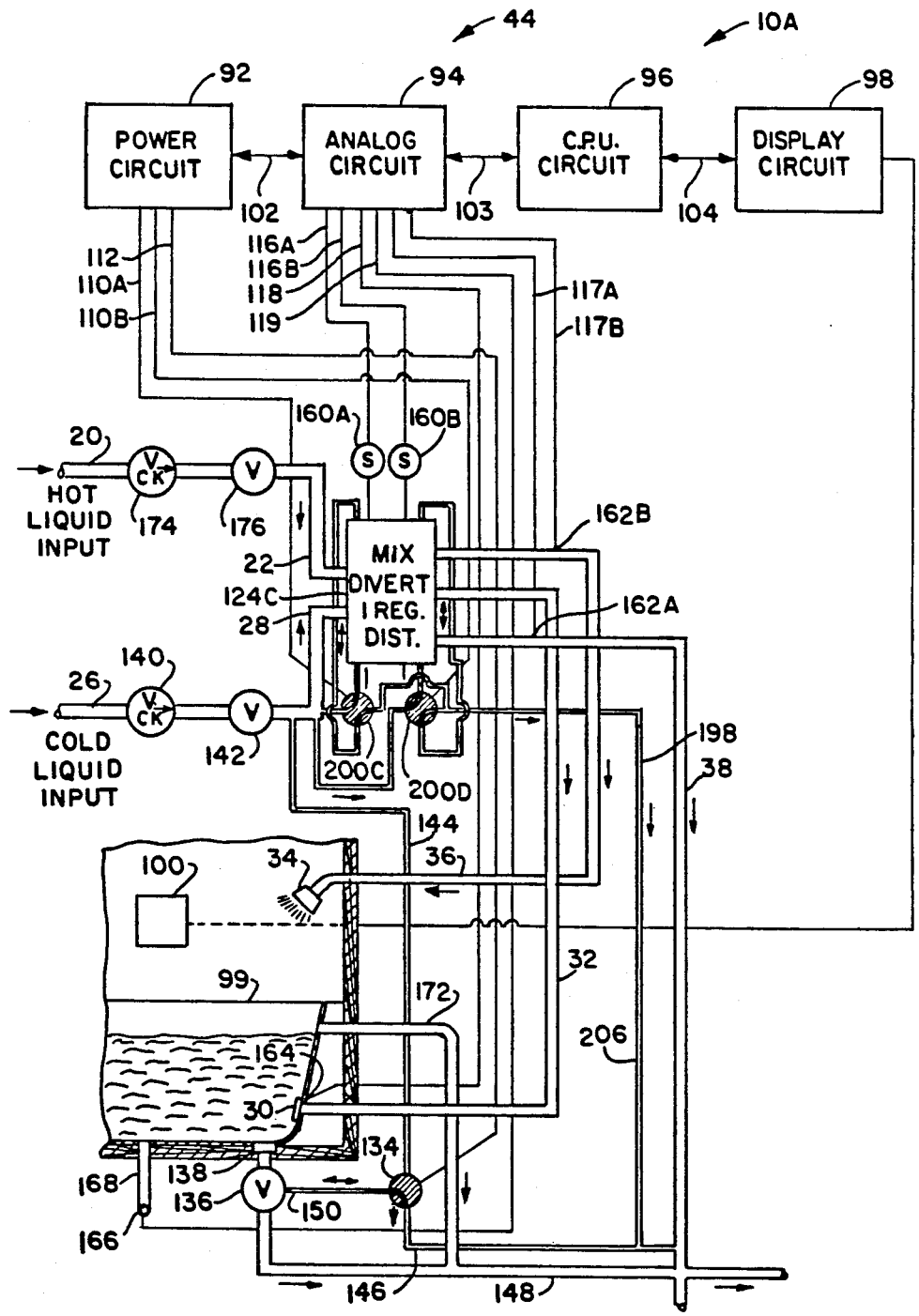
FIG. 8 is a diagram showing in more detail the liquid dispensing system of FIG. 1 utilizing a fourth valve means.

FIG. 8 represents a further variation of the system 10A shown in FIG. 1 incorporating still a further refinement of the valve means. The valve 124C which will be described in greater detail hereinafter with reference to FIGS. 36–39 is hydraulically operated by plural four-way valves 200C and 200D which are controlled by electrical conduits 110A and 110B. Plural position sensors 160A and 106B sense the position of the valve elements internal valve 124C. The valve in FIG. 8 provides a mixing function, a divert function, a distribution function as well as a flow regulation.

Figure 9:
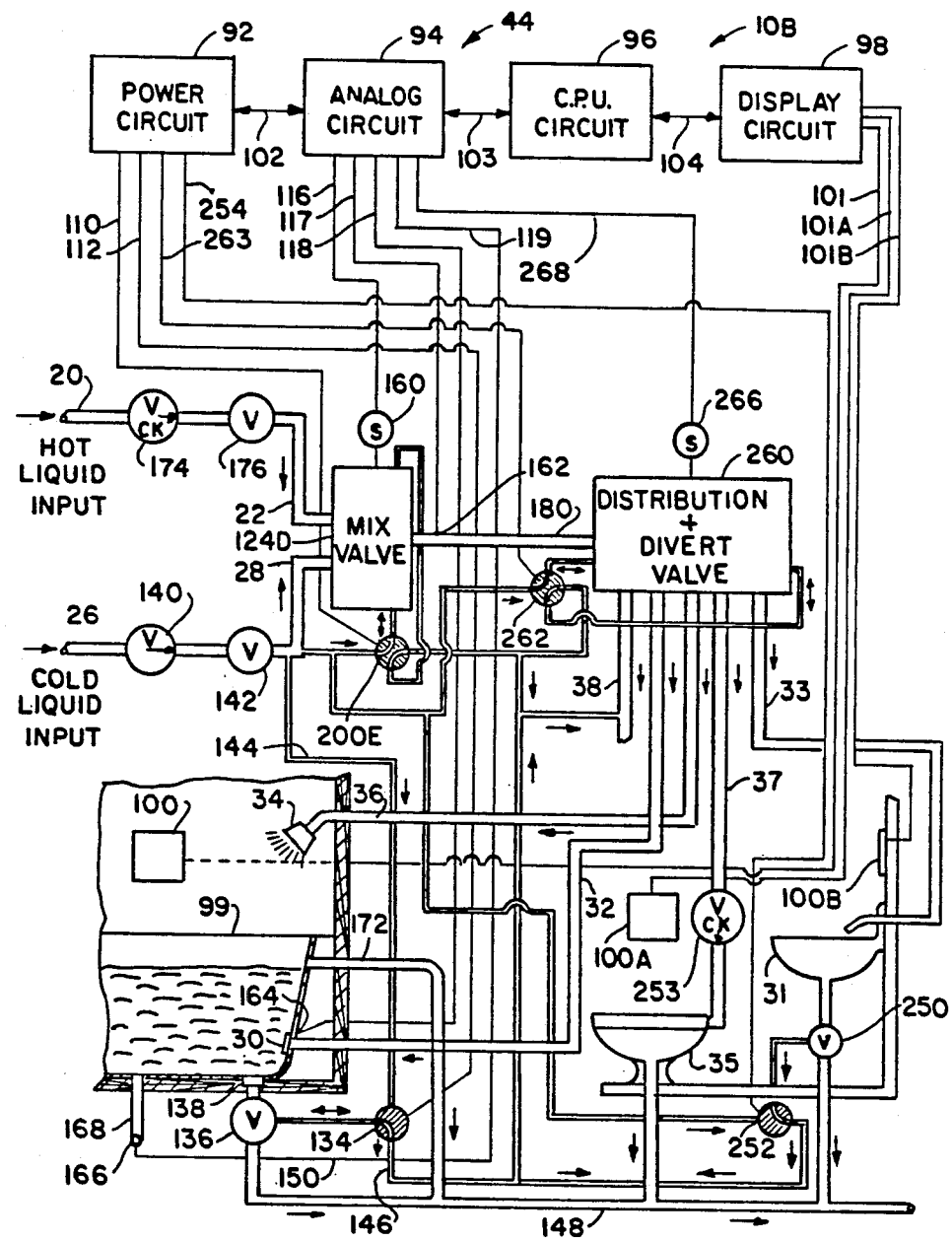
FIG. 9 is a diagram showing in more detail the liquid dispensing system of FIG. 2.

FIG. 9 represents a more detailed view of the system 10B set forth in FIG. 2 wherein the system controls the shower function 34, the bath function 30, the sink function 31 and the toilet function 35 through a check valve 253. Plural input and display units 100, 100A and 100B are provided for controlling the flow of water to the respective function. The sink function 31 includes a hydraulically operated drain valve 250 controlled by a three-way valve 252 which is activated by the power circuit 92 along a electrical conductor 254. The mixing valve 124D is hydraulically driven by a four-way valve 200E powered through an electrical conductor 110. The output of the mixing valve 124D is directed to a distribution valve 260 by conduit 180 which is also hydraulically operated by a four-way valve 262 powered from the power circuit 92 along electrical conductor 263. The position of the distribution valve 260 is sensed by sensor 266 and returned by conductor 268 to the analog circuit 94.

The system 10B shown in FIG. 9 operates in a manner similar to the operation illustrated in FIGS. 5–8. The mixing valve 124D provides a mixture of hot liquid and cold liquid at a desired temperature from the conduits 20 and 26 to the distribution valve 260. The distribution valve 260 initially diverts hot water less than a pre-selected temperature to divert conduit 38. Thereafter, the distribution valve 260 directs the liquid at the desired temperature to one of the shower function 34, the bath function 30, the toilet function 35 or the sink function 31. The drain valves 136 and 250 for the bath function and sink function are operated by use of the display control panels 100 and 100A. In this embodiment, the toilet 35 does not utilize a drain valve but operates on a conventional siphon process as should be well known to those skilled in the art. Typically, the toilet function will require only cold water so the diverting function will not be utilized in the flushing action of the toilet 35. However, in some locations, it is desirable to mix a portion of warm water with the cold water for flushing a toilet to prevent condensation and the like. The introduction of hot water in the toilet can be readily accomplished by reprogramming the central processing unit 96.

The system as shown in FIG. 9 provides water distribution to a shower function 34, a bath function 30, a toilet function 35, and a sink function 31. However, since the system 10B comprises ony a single mixing valve 124D, only one of the functions an be operated at a given time. According, the central processing unit 96 is programmed for a priority of operation of the four functions. The specific priority may be established by the user or based on a statistical analysis.

Figure 10:
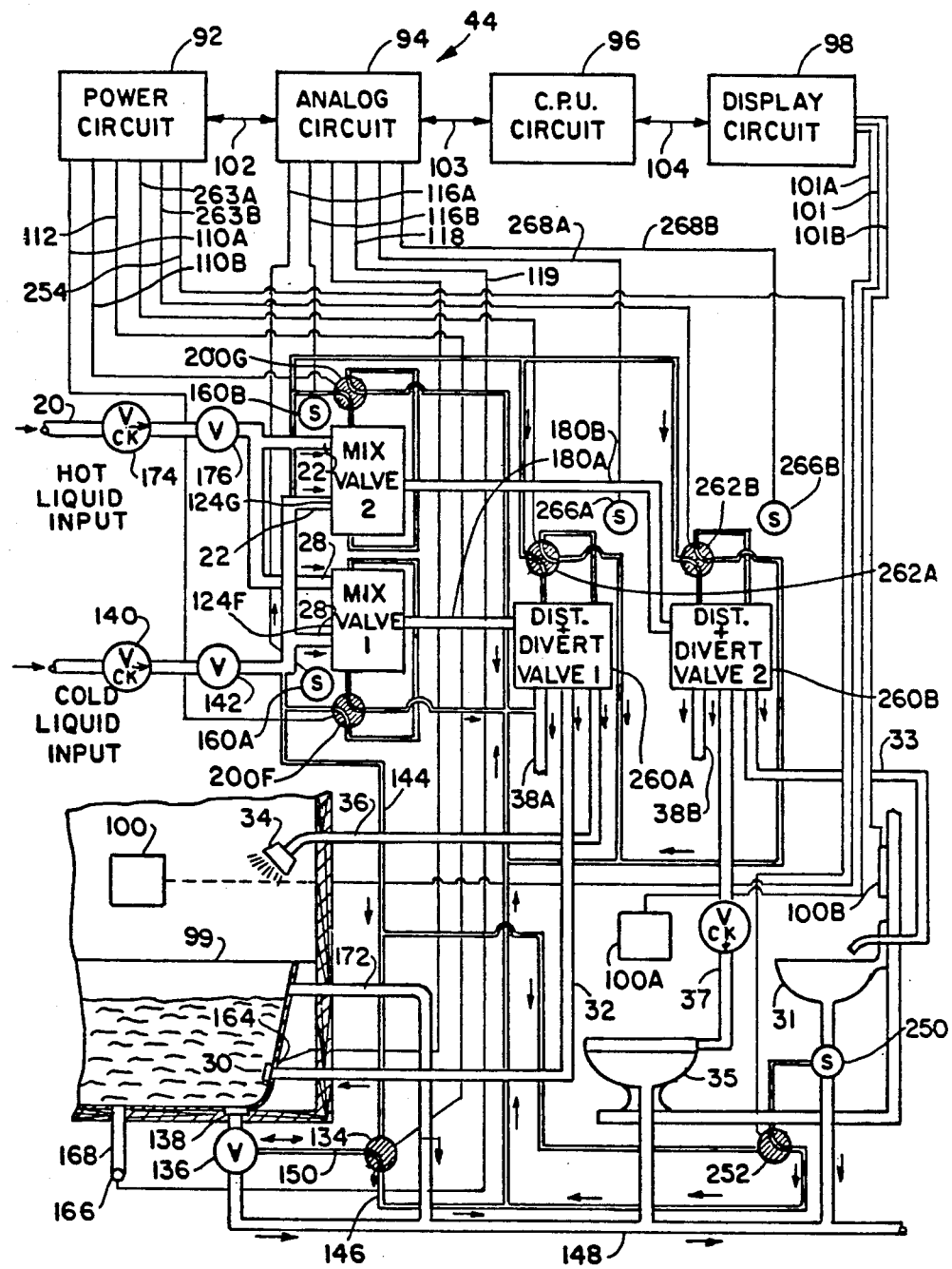
FIG. 10 is a diagram showing in more detail the liquid dispensing system of FIG. 3.

FIG. 10 illustrates a more detailed view of the system 10C shown in FIG. 3 wherein two of the four functions may be operated simultaneously and independently. In this embodiment, the system includes a first and a second mixing valve 124F and 124G which are hydraulically operated by plural four-way valves 200F and 200G powered by electrical conductors 110A and 110B from the power circuit 92. The outputs of mixing valves 124F and 124G are respectively directed by conduits 180A and 180B distribution valves 260A and 260B which are powered by four-way valves 262A and 262B which are activated by electrical connectors 263A and 263B. Mixing valve 124F in conjunction with distribution valve 260A provide a liquid output to the divert function through conduit 38A, and provide liquid output to the shower function 34, and the bath function 30.

Mixing valve 124G in conjunction with distribution valve 260B provide liquid output to the divert function through conduit 38B, and provide liquid output to the toilet function 35 and the sink function 31. This embodiment illustrates the priority of activation of the various four functions illustrated in FIG. 10. In this embodiment, the operator can elect either the shower or the bath function simultaneously with either the toilet or the sink function. Accordingly, the shower or bath can be simultaneously utilized with either the sink or the toilet function. Generally, the bath and the shower function will not be operated simultaneously, and in a similar manner the sink and toilet would generally not be operated simultaneously.

It should be appreciated that the system as described herein can be enhanced to provide a separate and independent operation for each of the functions shown in FIG. 10 or a separate and independent operation for all of the functions in each of the rooms set forth in FIG. 4. As the independent functions are required, the number of mixing valves is accordingly increased.

The toilet function 35 is controlled by a timer in the CPU 96 to allow a pre-programmed amount of time for proper flushing action. In addition, the timed function provides a distinct advantage over the prior art toilet systems. If the content of the toilet is liquid, then a shorter flushing time would be required to adequately flush the toilet as opposed to a toilet having a solid content. Accordingly, the display and control panel 100A provides a first and a second activation button as shown, the first having a shorter flushing cycle then the second flushing cycle for toilets with a liquid and a solid content respectively. The use of this type of function will greatly reduce the amount of water required to provide the necessary flushing functions.

FIG. 11 is a more detailed embodiment of the recovery means 40 shown in FIG. 1-4. In this embodiment, the hot liquid reservoir 18 is shown as a conventional hot water heater tank adjacent a recovery tank 280. The cold water input on conduit 12 is directed to a distribution valve 15 which is hydraulically operated by a three-way valve 282 to either direct the cold liquid into a conduit 42 through check valve 284 into the hot liquid reservoir 18. In the other position, the distribution valve 15 will direct the cold water input from conduit 12 through conduit 286 to venturi 288 and check valve 290 to the hot liquid reservoir 18. In this embodiment, water flowing through venturi 288 will draw recovered liquid from conduit 292 disposed within the recovery tank 280 into the hot liquid reservoir 18. A water level sensor 294 is connected by electrical conduit 52 to control the position of three-way valve 282 to activate distribution valve 15. Accordingly, if the liquid entering the recovery tank 280 from the divert output 38 is at the level 296 as shown, then the distribution valve 15 will direct the cold water entering conduit 12 to the venturi 288 to draw water from the recovery tank to the hot liquid reservoir 18. If the liquid in the water in recovery tank 280 is below the level sensor 294 then valve 282 will direct distribution valve 15 to direct the cold water from conduit 12 through conduit 42 and check valve 284 directly into the hot liquid reservoir tank 18. The size of recovery tank 280 and the specific design of venturi 288 is preferably designed to provide a nominal amount of liquid within the recovery tank 280 under normal use thus eliminating the possibility of the water in the recovery tank becoming stagnant. In the remote event that the level of the water in the recovery tank 280 exceeds the maximum level 296, the excess water will be discharged by overflow pipe 297 to the drain conduit.

FIG. 12 illustrates another embodiment of the liquid recovery system shown in FIG. 1, wherein the distribution and venturi valve 15A is combined into a single valving element. In this embodiment, the three-way valve 282 controls the venturi valve 15A between a first and a second position. In a first position, the valve provides a direct connection between the cold water input 12, conduit 42 and check valve 284 into the liquid reservoir 18. In a second position, the venturi valve 15A will allow the venturi operation to draw liquid through conduit 292 in the recovery tank 280 as heretofore described. The novel venturi and distribution valve 15A will be shown in greater detail in FIGS. 40 and 41.

As it will become apparent through the explanation of the various valves set forth hereinafter, the hydraulically operated valves set forth herein are of novel construction and may be applicable to many different types of fluid mixing and distribution uses well beyond the particular application as set forth in the present specification. The novel valves as will be hereinafter described, are hydraulically operated by hydraulic pressure from the water pressure of the cold water input conduit 26 thereby using available hydraulic pressure.

Figure 13:
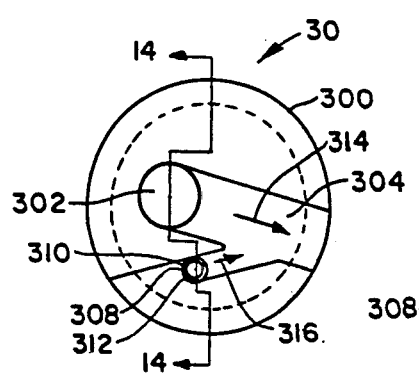
FIG. 13 is a sectional view along line 13—13 in FIG. 14 of a liquid output of the bath function shown in FIGS. 5-10.
Figure 14:
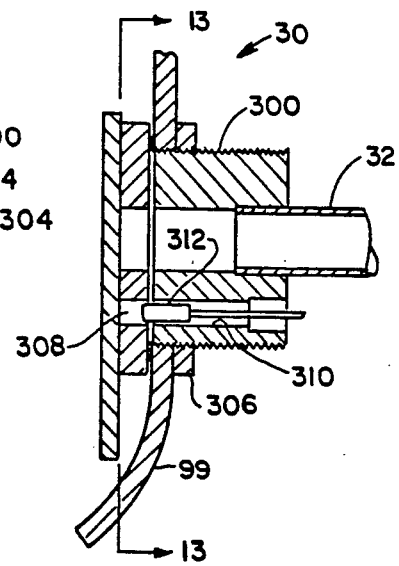
FIG. 14 is a sectional view along line 14—14 in FIG. 13.

FIG. 13 is a sectional view along line 13—13 of FIG. 14 illustrating the bath function 30 shown in FIGS. 5-10. The bath function includes a through housing 300 having an internal bore 302 comunicating with a primary channel 304 which is secured to the bathtub 99 by a nut 306. A secondary channel 308 communicates with the primary channel 304 and includes an aperture 310 for receiving a temperature sensor 312 shown as a thermistor. Water entering the bath function from conduit 32 is directed through bore 302 to channel 304 to fill the bathtub 99 as shown by arrow 314. When the level of water in the bathtub rises above the level of channel 308, the water flowing through channel 304 aspirates water from the bathrub 99 through channel 308 across thermistor 312 as indicated by the arrow 316. The mixture of the entering water from bore 302 and the aspirated water from channel 308 exit fromm an output region 318 of primary channel 304.

Figure 15A:
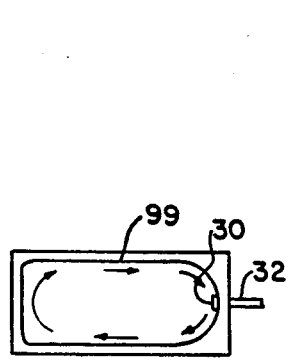
FIG. 15A is a top view of the bathtub showing the water circulation therein.
Figure 15:
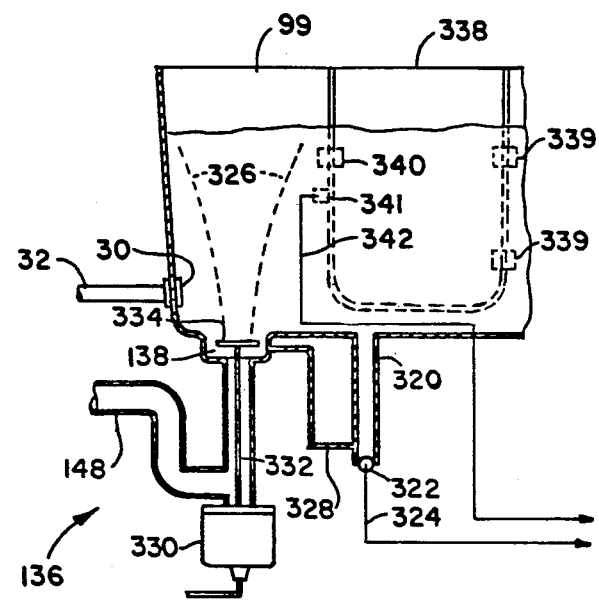
FIG. 15 is an enlarged view of the bathtub shown in FIGS. 5-10.
Figures 36, 37, 39:
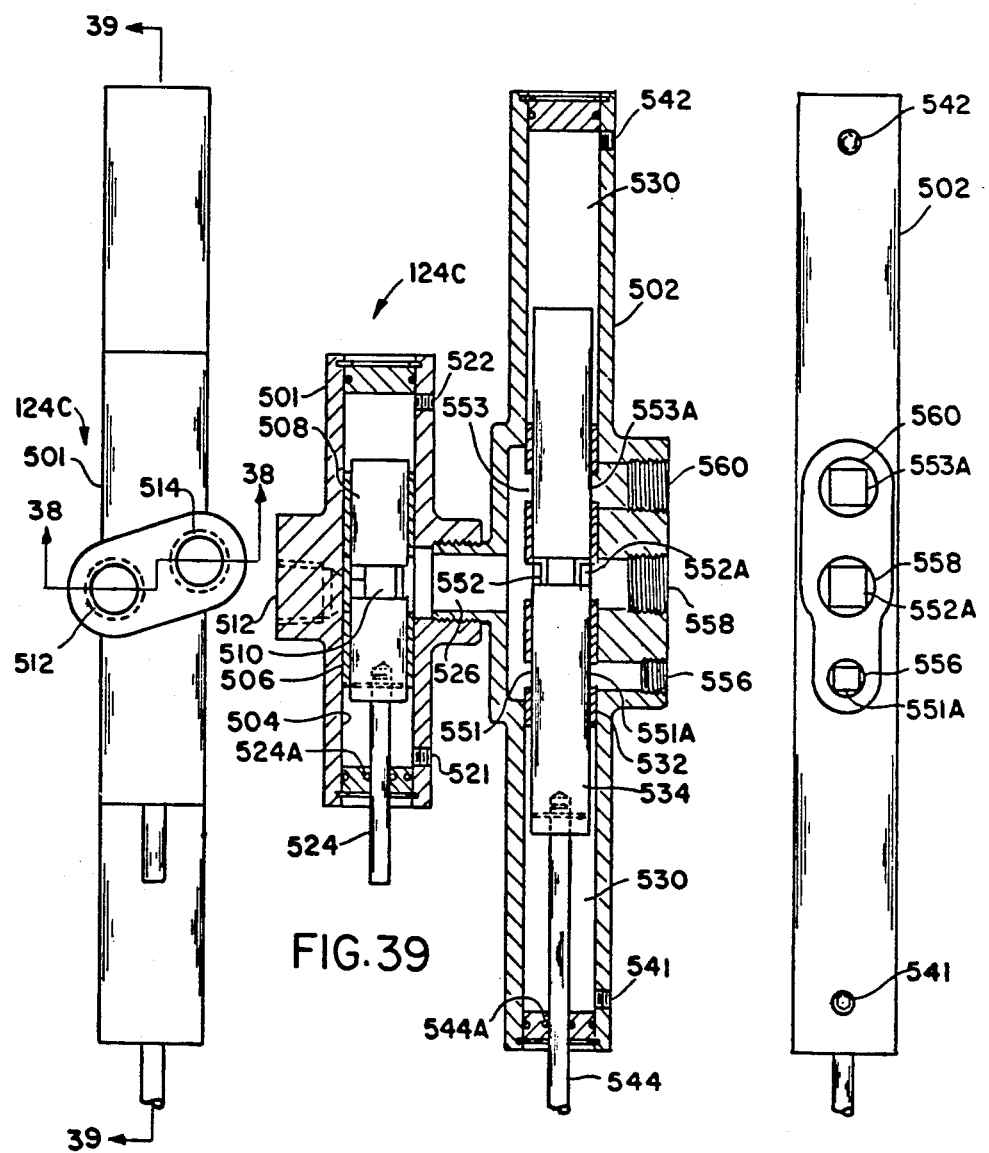
FIG. 36 is an elevational view of the input side of the valve means of FIG. 8.
FIG. 37 is an elevational view of output side of the valve means of FIG. 8.
FIG. 39 is a sectional view along line 39—39 in FIG. 36.

FIG. 15 is a side view partially in section showing in more detail the drain valve and the pressure sensing element to measure the temperature and the water level within the bathtub 99. FIG. 15A is a reduced plan view of the bathtub 99. The bathtub 99 includes a well 320 disposed remote from the drain 138 with a pressure transducer 322 being connected by an electrical conductor 324 to the electronic control 44. Well 320 is disposed remote from the drain 138 to prevent the drain vortex as shown by the lines 326 from interfering with the sensing of pressure by the pressure transducer 322. The fluid conduit 328 interconnects the well 320 with the drain 138 for emptying well 320 upon opening the drain 138 by aspirating water from the well 320 to the drain 138.

The drain valve 136 is shown having a hydraulic actuator 330 for activating a shaft 332 to move a drain plug 334. The drain valve 136 will typically have only an open or a closed position and accordingly a position sensor is not required for the drain valve 136. The bathtub 99 may also include the side access water tight door 338 having hinges 339 and an electrical latch 340 which may be the same or similar to the water tight door shown in our prior U.S. Pat. No. 4,360,935. In addition, a door position sensor 341 is connected by an electrical connector 342 to the electrical control circuit 44 for ensuring the disabling of the flow of liquid by the electronic circuit in the event the door 338 is in an open position. In addition, the latch 342 will prevent the opening of door 338 as long as the pressure sensor 322 senses a level of water within the bathtub 99.

The aspiration action of channels 304 and 308 functions to firstly circulate water within within the bathtub as shown in FIG. 15A to provide a uniform temperature within the bathtub 99. Secondly, the aspiration action of channels 304 and 308 function to measure the temperature of the uniform water internal the bathtub 99 by the aspiration of the uniform water through channel 308 across temperature sensor 312. The channel 308 eliminates the possibility of temperature within the channel 308 being unrelated to the actual temperature of the water in the bathtub 99. Accordingly, if the temperature within the bathtub is desired to remain at a desired temperature and a desired level, then the control circuit 44 will simultaneously activate the mixing valve, the divert and distribution valve and the drain valve 136 in accordance with the output of thermistor 312 and maintain the proper level and temperature of the water by simultaneously filling and draining water from the bathtub in accordance with the temperature as sensed by the temperature sensor 312. This system eliminates the need for electrical immersion heaters and the like which are costly, expensive and can possibly be dangerous due to the proximity of high electrical voltage and current proximate the water within the bathtub 99. It should be appreciated that in some instances, the user would not wish to recirculate water within the bathtub and accordingly this function may be inhibited by the operator. However, if the operator is an elderly or an infirmed person and wishes to be immersed in a constant temperature and level of water for a prolonged period of time, the bathtub will be intermittently or constantly filled with water at the proper temperature and will be intermittently or constantly drained to provide the proper water temperature and water level within the bathtub. In addition, the water within the bathtub 99 will be circulated through the aspiration action of channels 304 and 308.

FIGS. 16–19 show various views of the mixing valve and flow regulation valve 124A shown in FIG. 6 whereas FIGS. 20–26 illustrate the distribution and divert valve also shown in FIG. 6. The mixing and flow regulation valve 124A of FIGS. 16–19 comprise a valve body 350 having an internal body cavity 352 with a hot liquid input port 354 and a cold liquid input port 356 shown in section in FIGS. 17 and 18. A reciprocal valve piston 358 is disposed within the internal body cavity and is operated by a shaft 360 extending through a seal 360A. The shaft 360 is controlled by suitable means such as a pneumatic or hydraulic actuator 361 secured to the valve body 350 by screws to form a fluid tight seal as shown. The valve 124A also includes a valve output 362 which communicates with the internal body cavity 352 of the valve. Coaxially anchored within the internal body cavity 352 is a valve sleeve 364 having a hot liquid aperture 366 and a cold liquid aperture 370 disposed in the annulus 365. The valve piston 358 defines an annulus 365 having a hot liquid aperture 372 and a cold liquid aperture 374 extending between the exterior and the interior surfaces of the reciprocal valve piston 358. The annunlus 365 insures fluid communication between the apertures 366, 370, 372 and 374 irrespective of the rotational position of the valve piston 358 relative to the valve sleeve 364. A pressure equalization channel 375 equalizes the fluid pressure on opposed sides 358A and 358B of the piston 358 by preventing the trapping of liquid below the lower side 358B of the piston 358.

In contrast to FIG. 6, the conduit 180 is not shown since the valve body 350 includes the flow regulation valve 210 having a valve element 376 activated by a shaft 378 extending through a seal 378A. The shaft 378 is powered by a pneumatic or hydraulic actuator generally shown as 380 secured to the valve body 350 by screws to form a fluid tight seal as shown. The valve element 376 provides an ON-OFF function to the valve in addition to providing flow regulation of the liquid emanating from output 362. The actuator 380 function which should be well known to those skilled in the art, is a spring return type having a coil spring 382 to move the shaft 378 into the position as shown in FIG. 19. Upon input of pneumatic or hydraulic pressure through aperture 384 from valve 212 as shown in FIG. 16, the pneumatic or hydraulic pressure will cause expansion of chamber 386 defined by a flexible membrane 388 to drive shaft 378 in a downward position as shown in FIG. 16. Valve element 376 will mate against a valve seat 380 to close the regulating or flow control valve 210 as shown in FIG. 16. Upon the reduction of pressure from aperture 384, the coil spring 382 will move shaft 378 in an upward position as shown in FIG. 19 to open the valve. The actuator 380 also includes the position sensor 170 which moves concomitantly with the flexible membrane 388 to provide a signal to the electronic control 44 of the position of the valve element 376. The position sensor 170 may be a linear potentiometer or an inductance position sensor or any other suitable type of position sensor which should be well known to those skilled in the art and accordingly the specific details of the position sensor will not be set forth herein for the sake of clarity. The control of the position of valve element 376 provides liquid flow rate regulation to the output 362. The hydraulic actuator 361 of the mixing valve portion of FIG. 16 operates in a manner similar to actuator 380 and includes position sensor 160 shown in FIG. 6.

FIG. 16 illustrates the valve in the closed position wherein the valve element 376 is in contact with the valve seat 390 to close the flow control valve 210 in addition to piston apertures 372 and 374 being positioned by the actuator 361 to be blocked by the sleeve 364.

FIG. 19 illustrates the valve of FIG. 16 wherein the piston valve 358 has been moved by actuator 361 to enable the hot liquid to enter the hot liquid aperture 372 and the cold liquid to enter the cold liquid aperture 374 for mixing the hot and cold liquids within the internal body cavity 352. The output of the mixed hot and the cold liquids flow through the regulator valve defined by valve element 376 and valve seat 390 to the distribution valve 230 as shown in FIGS. 3, and 20–26. The volume of hot liquid and the volume of cold liquid entering the internal cavity 352 of the valve body 350 per unit time is determine by the respective pressures of the hot liquid pressure line and the cold liquid pressure line and the respective cross-sectional areas of variable apertures defined by the relative position of hot liquid apertures 366 and 372 and the relative position of the cold liquid apertures 370 and 374. The relative position of the hot liquid apertures 366 and 372 and the cold liquid apertures 370 and 374 is determined by the position of piston valve 358 relative to the valve sleeve 364. Accordingly, by movement of the piston valve 358 relative to the valve sleeve 364, a proportional amount of hot and cold liquid will enter the internal body cavity 352 to obtain the desired temperature selected by the operator by the display and control 108.

FIGS. 20-26 illustrate the distribution and divert valve 230 shown in FIG. 6. The valve 230 includes a valve body 420 having an internal body cavity 422 with a fluid input 424, a divert output 426 shown in greater detail in FIG. 21 and a first and a second distribution output 428 and 430. The fluid input 424 is connected to the output 362 of valve 124A shown in FIGS. 16-19 by a conduit 220 shown in FIG. 6 or in the alternative, the output 362 of valve 124A may be directly connected to the fluid input 424 of valve 230 by the threads shown in FIGS. 16-26. The divert output 426 is connected to the recovery means 40 by conduit 38 whereas the first distribution output 428 is connected to conduit 32 to provide the bath function 30 and a second distribution outlet 430 is connected to conduit 36 to provide the shower function 34. The valve 230 includes a reciprocal valve piston 432 having a valve annulus 434 which is longitudinally movable within the internal body cavity 422 by a shaft 436 extending through a seal 436A. Shaft 436 is activated by an actuator 438 which is secured to the valve body 420 by screws to form a fluid tight seal as shown. The actuator 438 may be similar to the actuator shown in FIG. 16 including the position sensor 236 shown in FIG. 6. The valve piston 432 also includes a pressure equilization channel 439 as heretofor described.

FIG. 22 illustrates the valve 230 in a first OFF position wherein the valve annulus 434 is disposed in the upper portion 420A of the valve body 420 to block the flow of liquid from the input to the outputs of the valve 230.

FIG. 23 illustrates the valve 230 in the bath function position wherein the valve annulus 434 is disposes adjacent the first distribution output 428. In this position, liquid is directed to flow from the fluid input 424 through the valve annulus 434 and out of the first distribution output 428 to conduit 32 shown in FIG. 6. Accordingly, the mixed liquids at the desired temperature emanating from the output 362 of valve 124A are directed by valve 230 to the bath function 30.

FIG. 24 illustrates the valve 230 in a divert position wherein the valve annulus 434 is disposed adjacent the divert output 428 enabling fluid entering the fluid input 424 to be directed through annulus 434 to exit the divert output 426 to conduit 38.

FIG. 25 illustrates the valve 230 in the shower function position wherein the valve annulus 434 is disposed adjacent the second distribution output 430 for directing the fluid to flow from the fluid input 424 through the valve annulus 434 and fluid outlet 430 to conduit 36.

FIG. 26 illustrates the valve 230 in a second OFF position wherein the valve annulus 434 is disposed in the lower portion 420B of the valve body 420 to block the flow of liquid from the input to the output of the valve 230.

As best shown in FIG. 21, the valve body 420 includes a boss 440 having an aperture 442 for receiving the temperature sensing transducer 162 (not shown in FIG. 21) for sensing the temperature of fluid entering the fluid input 424. The temperature sensor located in boss 440 is connected to the analog circuit 94 of the electronic control 44 for providing a control signal from power circuit 92 to actuate valve 200 for adjusting the mixing valve 124A. The valve body 420 is also shown having a second boss 444 having an aperture 446 for receiving an optional pressure transducer (not shown) for sensing the pressure of the liquid entering the fluid input 424. The optional pressure sensor may be connected to the analog circuit 94 of the electronic control 44 to provide control function to the regulator valve 220.

In a typical residential or commerical complex, the bathtub 99 is generally located remote from the hot water reservoir 18 and the hot water within the hot water line between the hot water reservoir 18 and the mixing valve 124A will be below the desired temperature selected by the operator. Accordingly, upon the operator selecting the desired temperature through display and control panel 108, the electronic control 44 will index the distribution and divert valve 230 into the divert position as shown in FIG. 24. Concomitantly therewith, the electronic control 44 will index piston 358 and valve element 376 of valves 124A and 210 to the positions shown in FIG. 19 to admit hot liquid and cold liquid into the internal cavity 352 through apertures 366, 372, 370 and 374 into the distribution and divert valve 230 and through conduit 38 to the recovery means 40. This below temperature liquid will be diverted to the recovery means 40 until the temperature of the water entering the input 424 of the distribution and divert valve 230 is at or above the desired temperature selected by the operator as measured by temperature sensor 162. Upon reaching or exceeding the desired temperature, the electronic control 44 will index piston valve 358 relative to the valve sleeve 364 to provide the proper cross-sectional areas for the variable apertures defined by apertures 366, 372, 370 and 374 to provide water at the desired temperature into input 424 of the distribution and divert valve 230. The electronic control 44 will also index the distribution and divert valve 230 into either the bath position shown in FIG. 23 or to the shower position as shown in FIG. 25 as determined by the selection of the operator. The electronic control 44 will also adjust valve element 376 to provide the proper liquid flow rate to the bath function 30 or the shower function 34. Thereafter, the electronic control 44 will index piston valve 358 relative to the valve sleeve 364 to change the cross-sectional areas of the variable apertures defined by apertures 366, 372, 370 and 374 to continue to provide water at the desired temperature to the bath function 30 or the shower function 34.

The combination of the mixing and flow regulation valve shown in FIGS. 16-19 and the distribution and divert valve 230 shown in FIGS. 20-26 provides a fail-safe function to prevent the accidental scalding of an operator in the event of malfunction either of the liquid pressure system or the electronic control 44. Valve 200 is biased into the position shown in FIGS. 6 and 16 to enable liquid to empty from the actuator 361 by a spring internal the actuator 361. Accordingly, in the event of electrical or water failure, the valve piston 358 will move to a downward position in FIG. 16 thus closing the valve. Valve 212 is biased into the position as shown in FIGS. 6 and 16 which will close the regulator valve 210 in the event of electrical failure without a water failure. The distribution and divert valve 230 shown in FIGS. 20-26 is operated by the three-way valve 232 which is biased into the position shown in FIG. 6. A spring internal acutator 438 biases piston 432 in an upward position as shown in FIG. 22. In the event of electrical failure, the piston 432 will move into the position shown in FIG. 22. In the event of malfunction of the valve 232 wherein the valve is moved into the position opposite to that shown in FIG. 6, the piston 432 will move by the liquid pressure to the full downward position as shown in FIG. 26 thus terminating operation of the water flow. An analysis of the various electric and water failure conditions by one skilled in the art will reveal that the combination of the mix valve 124A, the regulating valve 210, and the distribution and divert valve 230 provides a failsafe operation in the event of either electrical and/or water failure of the system.

FIGS. 27-35 illustrate a valve 124B which is suitable for use in the embodiment shown in FIG. 7. The valve 124B provides a mixing and distribution function within a single valve body 450 but lacks the flow regulation as shown in the valve set forth in FIGS. 16-19. The valve 124B includes an internal body cavity 452 disposed within the valve body 450 and a hot liquid input port 454 and a cold liquid input 456. The valve also comprises a valve piston 458 having a piston port or channel 459 which is longitudinally moveable within the internal body cavity 452 by hydraulic means as will be described in greater detail hereinafter. The valve body 450 includes a divert output 460 and a first and second distribution output 462 and 462. The divert output is connected to the recovery means 40 by conduit 38 as shown in FIG. 7 whereas the first distribution output 461 is connected to the bath function 30 by conduit 32 whereas the second distribution output is connected to the shower function 34 by conduit 36. The valve includes a valve sleeve 464, apertures 460A, 461A and 462A which respectively communicate with the divert output 461, the first distribution output 461 and the second distribution output 462. The valve sleeve 464 also has a hot liquid aperture 466A, 466B and 466C and cold liquid apertures 468A, 468B and 468C which are offset from one another in a manner similar to FIG. 16.

The valve body includes a first hydraulic input 471 and a second hydraulic input 472 for providing hydraulic pressure on opposed ends 474 and 476 to move the valve piston 458 longitudinally within the internal body cavity 452. For example, if pressure is applied to the first hydraulic input 471 in FIG. 31, the piston will move in an upward direction whereas if fluid pressure is applied to the second hydraulic input 472 in FIG. 35, the piston will move in a downward direction. It should be appreciated that the position of piston valve 458 can be regulated by regulating the relative pressure differential between the first and second hydraulic inputs 471 and 472. An appropriate position sensor 160 shown in FIG. 7 is connected to shaft 478 extending through a seal 478A to move in unison with the piston 458 as should be well known to those skilled in the art.

The valve as illustrated in FIGS. 27-35 operates in the following manner. Upon selecting a predetermined temperature, the piston valve 458 is moved such that port or channel 459 is disposed adjacent the hot liquid and cold liquid apertures 466A and 468A and the divert aperture 460A to provide the mixture of fluid through the divert output 460 until the temperature at the divert output 460 has reached a predetermined temperature. An appropriate temperature means (not shown) is preferably located adjacent the divert output 460. Indexing of the piston port or channel 459 about the hot liquid aperture 466A and the cold liquid aperture 468A will cause proportional amounts of hot and cold liquids to flow through the divert aperture 461A. Upon obtaining the desired temperature, the electronic control 44 will index the valve piston 458 to produce an output to either the first distributor output 461 as shown in FIG. 33 or the second distribution output 462 as shown in FIG. 34. FIG. 33 illustrates the proportional mixing of hot and cold water to be discharged to the first distribution outlet 461 whereas FIG. 34 illustrates the distribution of the mixed hot and cold liquids to the second distribution outlet 462. Since the relative spacing of apertures 466A, 466B and 466C and 468A, 468B and 468C remains the same, the valve piston 458 can quickly index from the divert position as shown in FIG. 32 either the first or second distribution position as shown in FIGS. 33 and 34 and maintain essentially the same proportional mixing ratio of hot and cold liquids. FIG. 35 illustrates the valve in an OFF position in a manner similar to FIG. 31 and also demonstrates that the valve is of a fail safe configuration wherein the loss of hydraulic pressure at either one of the first and second hydraulic inputs 471 and 472 will cause the piston valve 458 to be disposed in either the position shown in FIG. 31 or the position shown in FIG. 35 wherein the valve will be in an OFF position.

Figure 38:
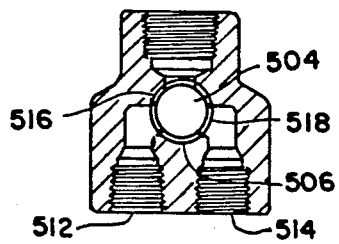
FIG. 38 is a sectional view along line 38—38 of the mixing valve portion of the mixing, regulation, diverting and distribution valve shown in FIG. 36.

FIGS. 36-39 illustrate various views of the valve 124C shown in FIG. 8. In this embodiment, the valve provides the mixed output of liquids to the recovery means 40 by the conduit 38 as well as provide outputs to the bath function 30 through conduit 32 and the shower function 34 by conduit 36. The valve comprises a first and second valve body 501 and 502 with the first valve body having an internal cavity 504 holding a sleeve 506 with a longitudinally movably piston 508 disposed therein. The piston includes a piston annulus 510 in a manner similar to the valve shown in FIGS. 27-35. The first valve body 501 includes a hot water input 512 and a cold liquid input 514 which communicates through apertures 516 and 518 in the sleeve 506 as best shown in FIG. 38. As it can be clearly seen from FIG. 36, the apertures 516 and 518 connected to hot water inputs 512 and 514 are on different vertical levels in FIG. 36, enabling the piston annulus 510 to expose proportional amounts of the areas of apertures 516 and 518 into the internal cavity 504 of the valve body. The piston 508 is moved by the application of hydraulic pressure to one of the first and second hydraulic inputs 521 and 522 in a manner similar to FIGS. 27-35. A shaft 524 extends through a seal 524A for interconnecting the position sensor 160A shoown in FIG. 8 to piston 508 for sensing the position of piston 508 within the internal body cavity 504. As it should be clear from the explanation with respect to FIGS. 27-35, the relative position of piston 508 within the valve body 501 will provide proportional mixing of the hot and cold liquid entering inputs 512 and 514 to provide an output through output conduit 526 into a flow regulation and mixing valve retained within the second valve body 502.

The flow regulation and distribution valve contained within the valve body 502 operates in a similar manner including an internal body cavity 530 having a sleeve 532 with a longitudinally movable piston 534 which is movable by hydraulic force applied to one of a first and a second hydraulic input 541 and 542 in a manner heretofore described. Shaft 544 extends through seal 544A for interconnecting the position sensor 160B shown in FIG. 8 to the piston 534 for sensing the position of piston 534 within the valve body 502. In this embodiment, the sleeve 532 has a plurality of input apertures 551, 552 and 553 which are in direct alignment with output apertures 551A, 552A and 553A which are respectively connected to a divert output 556, a first distribution output 558, and a second distribution output 560. Divert output 556A is connected to the recovery means 40 by conduit 38 whereas the first distribution output 558 is connected to the bath function by conduit 32 whereas the second distribution output 560 is connected to the shower function 34 by conduit 36.

Since the apertures 551, 552 and 553 are in alignment with the output apertures 551A, 552A and 553A, the relative position of the annulus 510 adjacent one of the inputs 551, 552 or 553, determines the distribution of the mixed liquid entering the input 526. Furthermore, the relative position of the annulus 510 adjacent the selected apertures 551 - 553, determines the flow rate of the fluid between the input apertures 551 - 553 and the output apertures 551A - 553A, respectively. The operation of the valve shown in FIGS. 36–39 should be apparent to those skilled in the art in view of the explanation of the valve shown in FIGS. 27–35. The valve system shown in FIGS. 36–39 provides the proper failsafe features as set forth hereinbefore as well as providing a mixing distribution and flow regulation by hydraulic action which is of compact design and may be readily installable within the confines of standard two inch by four inch studs on sixteen inch centers of a building structure.

As can be readily appreciated from the novel valves set forth in FIGS. 16–39, various variations may be provided upon the basic use of a valve body with a longitudinally movable piston therein, wherein the piston contains a piston annulus for communicating input and output ports disposed in aligned or non-aligned positions or faced positions within the interior of the valve body. Accordingly, it should be clear from the enclosed examples that the distribution valve 260 shown in FIG. 9 may be a modified version of the valve body 502 having a longer piston stroke with a larger number of output ports. In addition, the valves shown in FIG. 20 may be a combination of the valves heretofore described, which should be evident to those skilled in the art having an understanding of the present specification.

Figure 40:
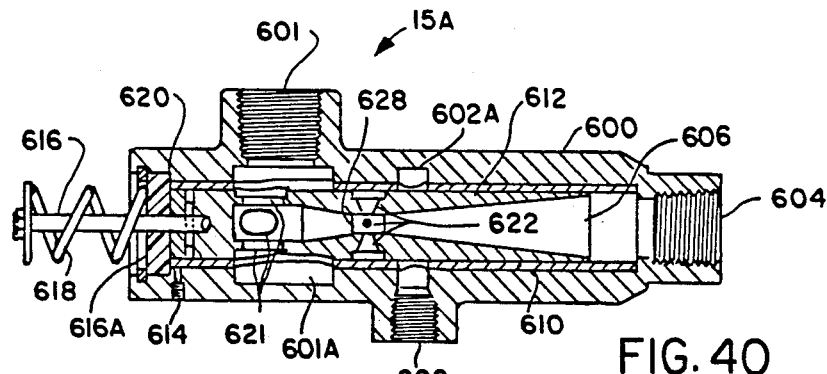
FIG. 40 is a sectional view of the valve of FIG. 12 in the non-aspirating position.
Figure 41:
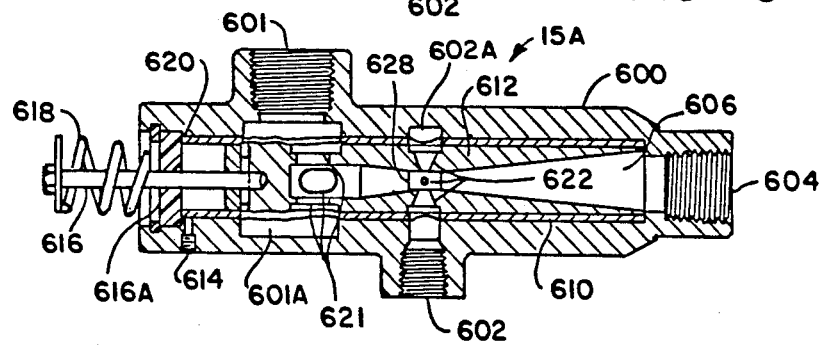
FIG. 41 is a sectional view of the valve of FIG. 12 in the aspirating position.

FIGS. 40 and 41 illustrate the venturi valve 15A illustrated in FIG. 12. Venturi valve 15A comprises a valve body 600 having a first fluid input 601, a second fluid input 602 and a fluid output 604 communicating with an internal body cavity 606. The valve body 600 includes an annular recesses 601A and 602A disposed respectively adjacent the first and second inputs 601 and 602. A valve sleeve 610 is coaxially secured within the valve body in a manner similar to the previously described valves for receiving therein a movable piston 612 operable by hydraulic force through a hydraulic input 614. A shaft 616 is connected to piston 612 and extends through a seal 616A disposed in an end plug 620 with a return spring 618 biasing the valve into the position shown in FIG. 40. Application of hydraulic liquid into input 614 will cause the piston to move toward the right as shown in FIG. 41.

The valve piston 612 includes a plurality of first apertures 621 for receiving liquid therethrough from an annular recess 601A surrounding the piston 612 and includes a plurality of second apertures 622 for receiving liquid therethrough from an annular recess 602A surrounding the piston 612. A venturi 628 is lcoated within the piston 612 adjacent the plurality of second aperatures 622. The internal cavity 606 is always in fluid communication with the first fluid input 601 through the annular recess 601A and first apertures 621.

When valve 15A is in the position as shown in FIG. 40, liquid from input line 286 in FIG. 12 is applied to the first input 601 to flow through the internal cavity 606 and the output 604 to conduit 42 to the hot liquid reservoir 18. In this position, there is no aspiration of liquid from the recovery tank 280. When fluid pressure is applied to input 614, piston 612 moves to the position shown in FIG. 41 whereat water flowing from the first input 601 to the output 604 aspirates liquid from the recovery tank 280 along conduit 292 into the second input 602 to exit from the output 604 to the hot liquid reservoir 18. In the event of malfunction of the hydraulic system applying hydraulic pressure to input 614, the valve piston 612 will return to the position as shown in FIG. 40 by action of spring 618 whereat the input water system will operate in a conventional manner.

As it can be seen from the foregoing variations of valves shown in FIGS. 16–41, numerous other variations of the valve body and/or the valve sleeve apertures and/or the piston and the piston apertures may be fashioned in light of the present disclosure to provide valves for other installations and other applications all of which are considered within the present invention as claimed hereinafter.

Figure 42:
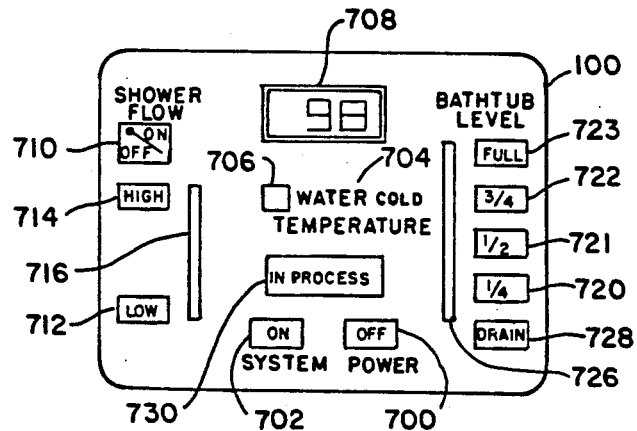
FIG. 42 is a front view illustrating in more detail the switching panel shown in FIG. 5-10.

FIG. 42 is an enlarged view of the display and control panel 100 shown in FIGS. 5–10. The control panel comprises a system power OFF switch 700 and a system power ON switch 702 for providing power to the system. Switches 704 and 706 control the selection of the water temperature desired by the operator. Depression of switch 706 will incrementally increase the selected temperature which will be displayed in a digital display 708. Additional depressions of switch 706 will incrementally raise the temperature displayed 708 by an incremental amount whereas the depression of switch 704 will incrementally decrease the temperature indicated in display 708.

The control panel also comprises an ON/OFF switch 710 for the shower function with selector switches 712 and 714 for selecting the flow rate of the water emanating from the shower function 32. The shower flow rate is visually indicated by a bar display 716. Switch 714 enabls the operator to select a high flow rate by repeated depressions of switch 714 with the flow rate being indicated by an illuminated bar extending from the bottom of display 716 to the top of display 716. Depression of switch 712 will reduce the flow rate of the shower function.

In a similar manner, the water level desired in the bathtub is controlled by switches 720, 721, 722 and 723 with a visual indication of the selected level being displayed by a bar display 726. Accordingly, if the operator desired one half of the bathtub to be filled, the operator will depress switch 721 whereat the display 726 will visually displaying the one-half level of water selected in the bathtub. Switch 728 controls the drain function. Display 730 indicates that the system is the divert function mode to verify to the operator that the system is functioning but is unable to dispense water due to the water temperature being below the desired level selected in display 708.

For example, the operator will first energize the system by depressing switch 702. Unless the shower function 32 is activated by depression of switch 710, the system will automatically default to the bathtub function. The operator will then select the desired temperature by depressing either the hot incremental switch 706 or the cold incremental switch 704 while reading the desired temperature on display 708. In the event that the operator fails to depress either switch 704 or 706, the electronic control 44 will provide a default temperature default of 95 degrees F. The operator will then select the amount of level desired in the bathtub by depressing one of the switches 720 - 723 with the desired level being indicated by bar display 726. The system will be then activated into the divert mode until the temperature of water emanating from distribution and divert valve reaches the temperature indicated in display 708. During this process, the display 730 will be illuminated to indicate to the operator the system is properly functioning.

Figure 43:
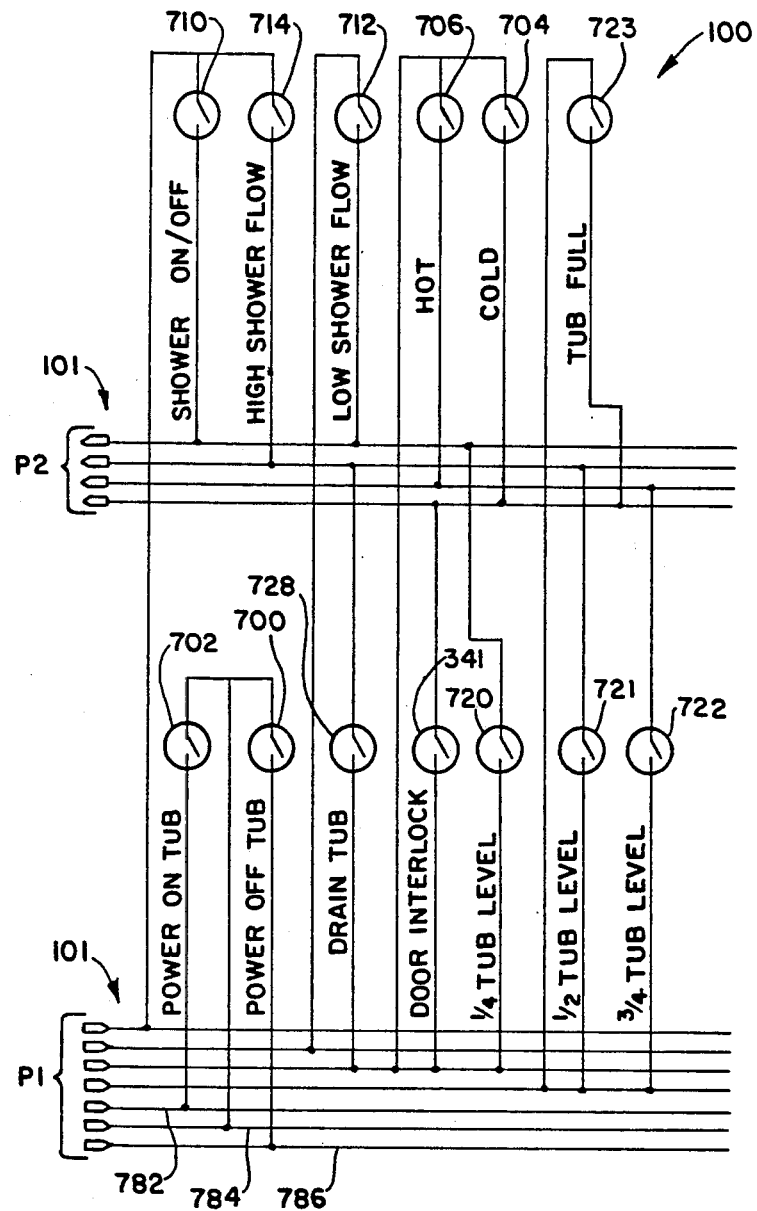
FIG. 43 is a circuit diagram showing the interconnection of the switches of the switching panel shown in FIG. 42.

FIG. 43 is a schematic view of the switches shown in the control and display panels 100 as set forth in FIGS. 5 and 42. The switches are disposed between buses connected to plugs P1 and P2. The door interlock switch 341 also shown in FIG. 15 is connected between buses connected to plugs P1 and P2 to inhibit operation of the shower or bath function in the event that switch 341 in FIG. 15 determines that the access door 338 is in an open position.

Figure 44:
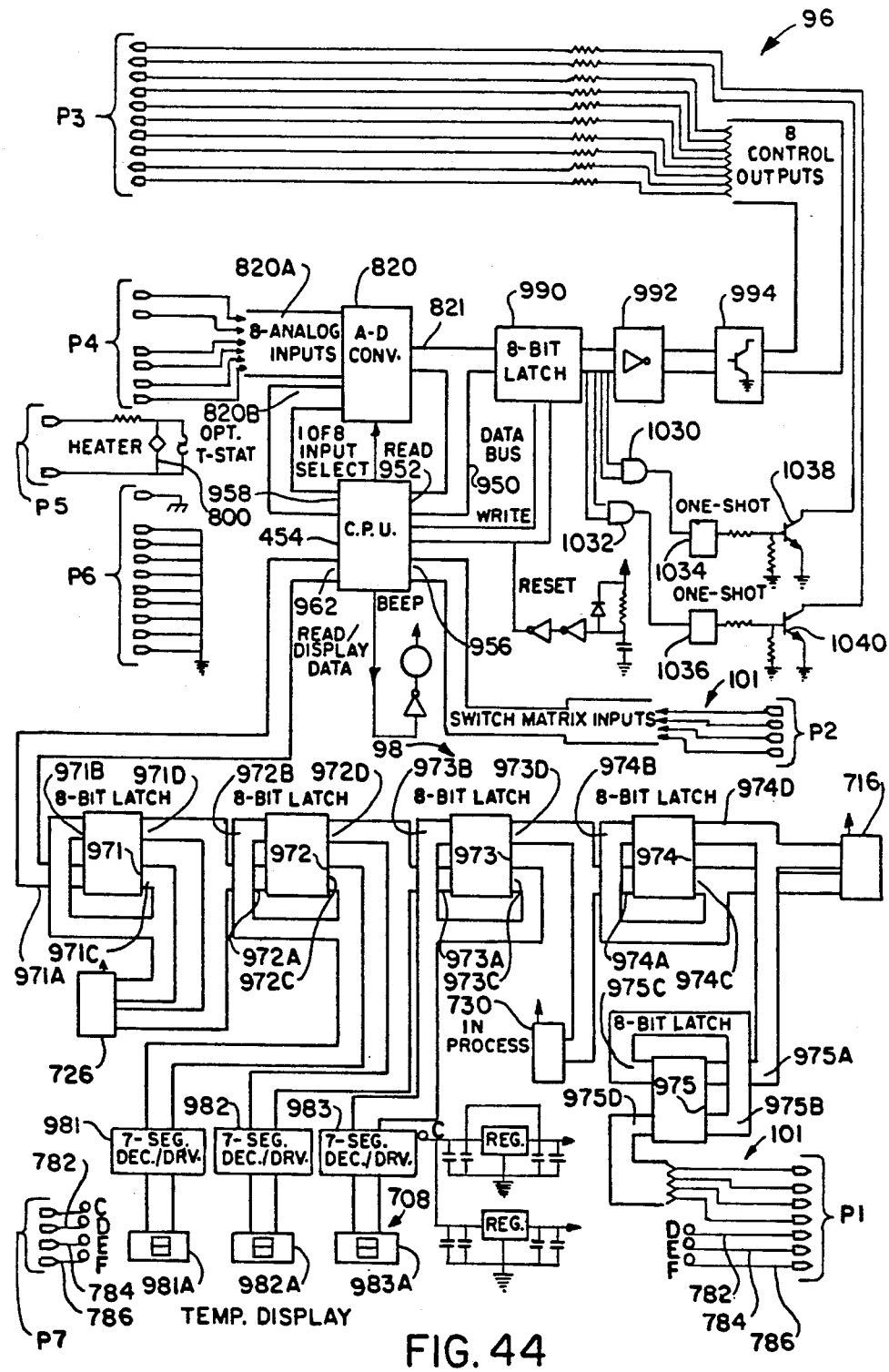
FIG. 44 is a circuit diagram illustrating the central processing unit shown in FIG. 5.

The plugs P1 and P2 in FIG. 43 are connected to plugs P1 and P2 of the display circuit 98 and the central processing circuit 96 shown in FIG. 44. Plugs P3, P4, P5, and P6 and P7 of FIG. 44 are respectively connected to plugs P3, P4, P5, P6 and P7 of analog circuit 94 shown in FIG. 45. Plugs P8, P9 and P10 of the analog circuit 94 of FIG. 45 are respectively to connected plugs P8, P9 and P10 to the power circuit 92 shown in FIG. 46.

Figure 46:
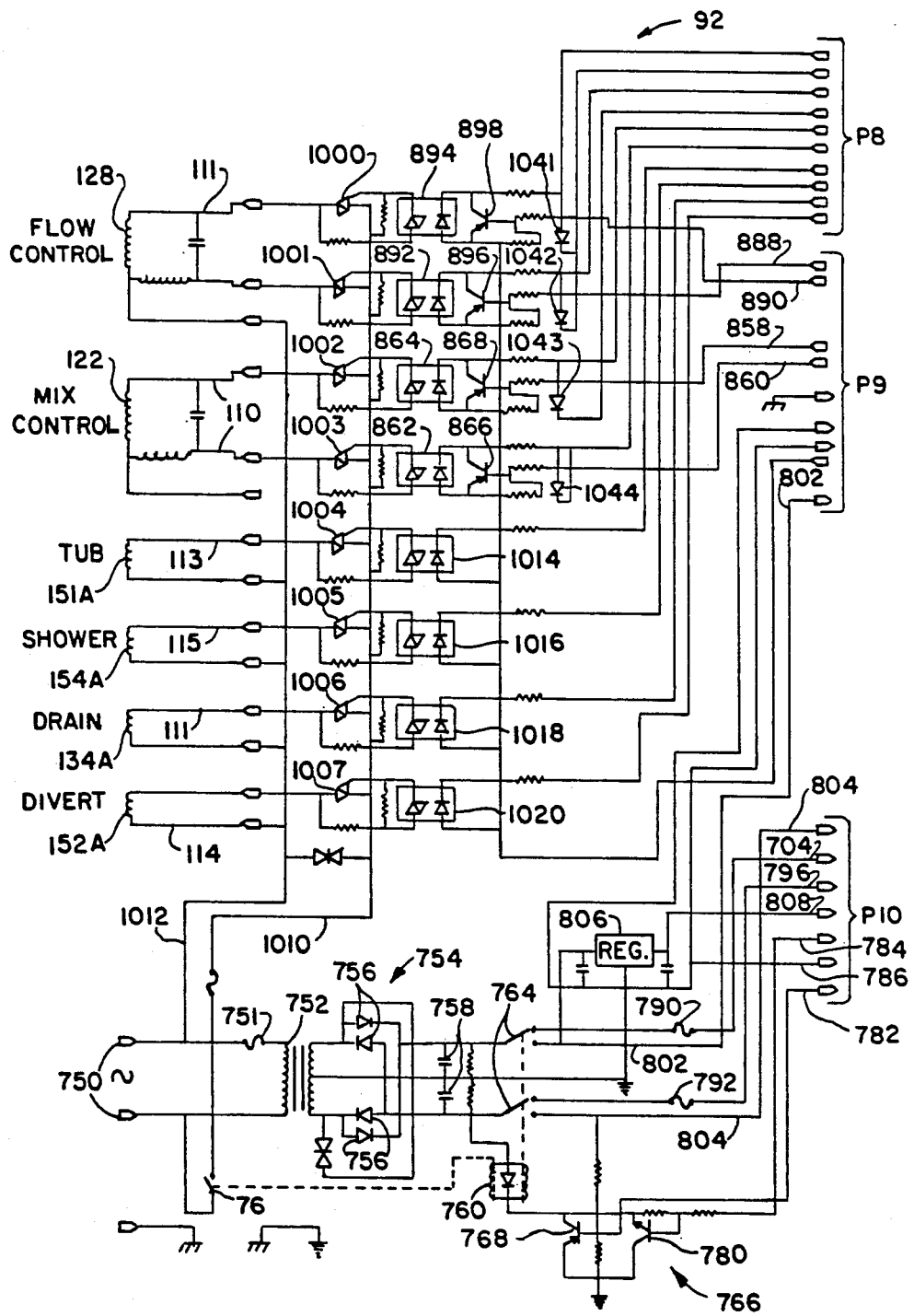
FIG. 46 is a circuit diagram illusrating the power circuit shown in FIG. 5.

The power circuit 92 shown in FIG. 46 receives conventional AC power on terminals 750 which is applied through a fuse 751 to a transformer 752. A rectifier circuit generally shown as 754 comprise diodes 756 and capacitors 758. A relay 760 controls the position of switches 762 and 764. Relay 760 is controlled by a power latch transistor circuit 766 comprising transistor 768 and 780. Transistorized power latch circuit 766 is controlled by input along lines 782, 784 and 786 through plugs P10, P7 and P1 to power OFF switch 700 and power ON switch 702. Switch 764 is shown in the OFF position whereat the rectified voltage of the rectifier circuit 754 is applied through fuses 790 and 792 and conductors 794 and 796 through plug 10 and plug 5 to a heater 800 shown in FIG. 44. Heater 800 eliminates the buildup of moisture within the electronic control when the circuit is in an OFF condition.

Upon activation of power ON switch 702 in FIG. 43, the power transistor latch circuit 766 closes switch 762 and moves switches 764 to the position opposite to that shown in FIG. 46 to apply rectified voltage to lines 802 and 804 which are connected through plugs P9 and P10 to provide operating power to the circuit. The rectified output is also applied to a regulator 806 for providing a regulated output on conductor 808 of plug P10. Switch 762 applies AC power to the various electromechanical devices shown in FIG. 46 as will be described in greater detail hereinafter. Lines 802 and 804 are connected by plugs P9 and P10 to a regulator circuit generally designated 812 for producing a regulated positive and negative voltage for the analog circuit 94.

Figure 45:
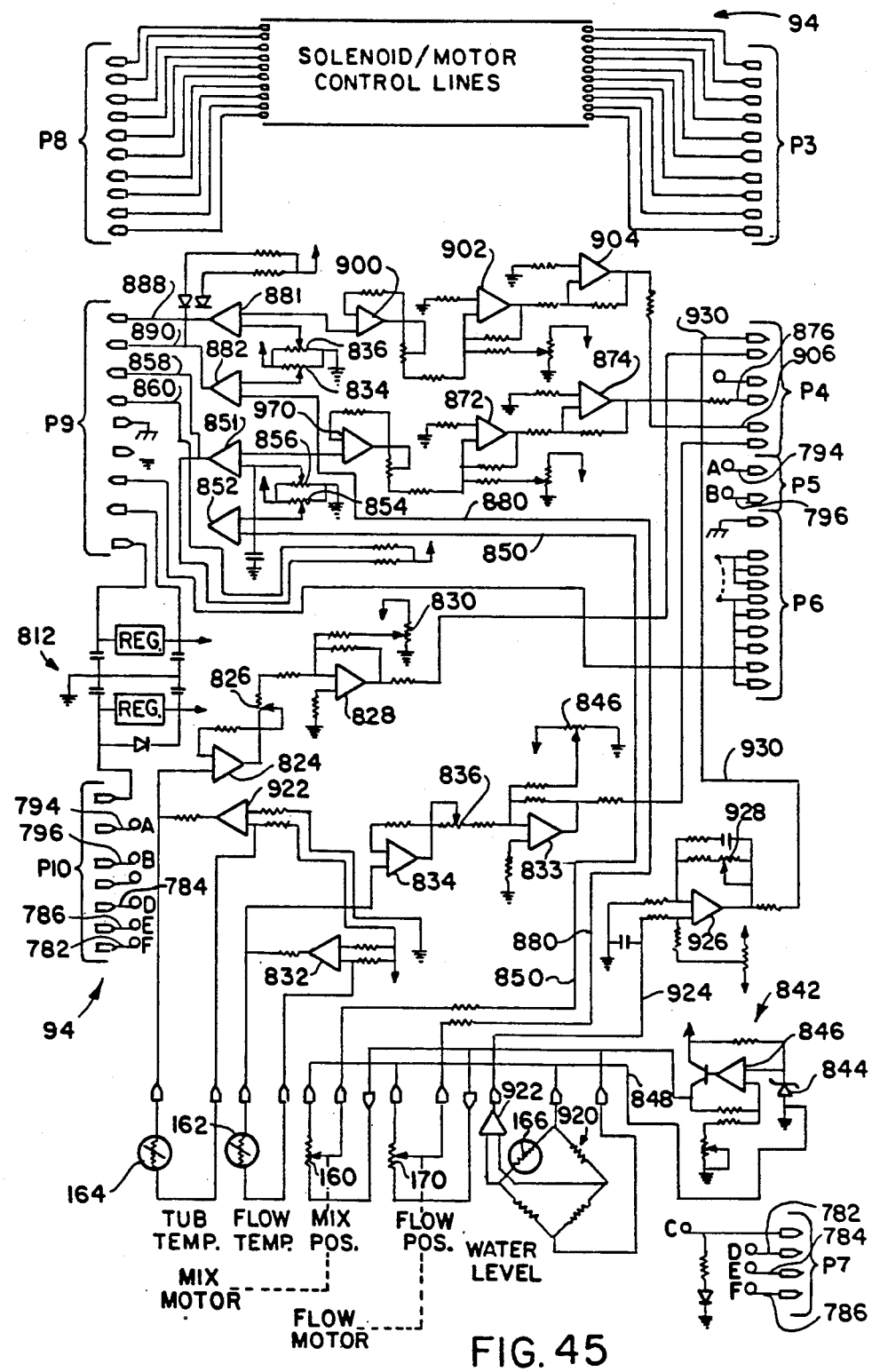
FIG. 45 is a circuit diagram illustrating the analog circuit shown in FIG. 5.

The analog circuit shown in FIG. 45, illustrates the tub temperature sensor 164, the temperature sensor 162, the position sensor 160, and 170, and the water level sensor 166. The sensors 162, 164, 166 and 170 are interconnected through various circuitry and plug P4 to be applied to a first input 820A of an analog-to-digital converter 820 shown in FIG. 44. More particularly, the tub temperature 164 shown as a thermistor is connected to a constant current generator 822 in addition to being connected to an operational amplifier 824 having a potentiometer 826 for controlling the gain of the amplifier 824. The output of operational amplifier 824 is connected to a operational amplifier 828 incorporating a potentiometer 830 for providing a voltage offset for input to the analog to digital converter 820. In a similar manner, the sensor 162 shown as a thermistor is connected through a constant current generator 832 and a operational amplifier 834 having a variable gain potentiometer 836. The output of operational amplifier 834 is connected to an operational amplifier 838 having a potentiometer offset 840.

The position sensor 160 is connected to a constant voltage source generally shown generally as 842 comprising a zener diode 844 and an operational amplfiier 846 for providing a constant voltage on line 848. The output of the position sensor 160 is applied on line 850 to comparators 851 and 852. The comparators 851 and 852 compare the actual position of the position indicator 160 with maximum allowable positions as determined by potentiometers 854 and 856. The outputs of comparators 851 and 852 are applied to lines 858 and 860 through plug P9 to terminate operation of opto-isolators 862 or 864 through transistors 866 and 868 as will be described in greater detail hereinafter. In the event that the motor position sensor 160 extends beyond a preselected distance as determined by potentiometer 854 and 856, the comparators 851 and 852 will terminate operation of the motor 122 by terminating operation of the light emitted by the optoislators 862 or 864. Line 850 is also connected through amplifiers 870, 872 and 874 to line 876 and plug P4 to contact the first input 820A of the analog to digital converter 820.

In similar manner, the position sensor 170 is connected by a line 880 to comparators 881 and 882 which compare the actual position of potentiometer 170 with the limit of position as determined by potentiometers 884 and 886. The output of comparators 881 and 882 are applied on lines 888 and 890 of plug P9 to terminate the action of optoisolators 892 and 894 through transistors 896 and 898. Accordingly, the comparators 881 and 882 will terminate power to the flow control 128 upon the position sensor 170 obtaining one of the maximum limits of movements as determined potentiometers 8884 and 886. Line 880 is also connected through amplifiers 900, 902 and 904 to connector 906 to be trnasferred by plug P4 to the first input 820A of the analog to digital converter 820.

The bath level sensor 166 is disposed within a bridge circuit shown generally as 920 with the output thereof being amplified by an operational amplfier 922. The output of operational amplifier 922 is applied on conductor 924 to a scaling operation amplifier 926 with the scaling factor being determined by a feedback potentiometer 928. The output of scaling operational amplifier 926 is applied on conductor 930 through plug P4 to the analog to digital converter 820.

As heretofore described, the outputs from temperature sensor 164, the temperature 162, the position sensors 160 and 170 and the liquid level sensor 166 are applied through plug P4 to the input 820A of the analog to digital converter 820 shown in FIG. 44. The output 821 of the analog to digital converter 820 is applied on a data bus 950 to a first input 952 of the central processing unit 954. The central processing unit 954 also received a second input 956 from plug P2 connected to the control panel 100. A first output 958 of the central processing unit 954 is reapplied to a second input 820B of the analog to digital converter 820. In addition, a second 962 of the output central processing unit 954 is applied to the display circuit 98 shown in FIG. 44.

The display circuit 98 comprises a first through fifth eight-bit latches 971 - 975. Each of the eight-bit latches 971 - 975 comprise plural four-bit inputs and plural four-bit outputs. Latch 971 includes a first and second input 971A and 971B and a first and second output 971C and 971D. In a similar manner, latch 972 comprises inputs 972A, 972B and outputs 972C and 972D. Latch 973 comprises inputs 973A, 973B and outputs 973C and 973D and latch 975 includes inputs 975A, 975B and output 975C and 975D. Latch 974 comprises inputs 974A and 974B with output 974C and 974D. The output 962 of central processing unit 954 is connected to input 971A of latch 971. The output to 971C of latch 971 is connected back to the input 971B of latch 971. The output 971D of latch 971 is connected to the input 972A of latch 972. The outputs 971D an 971C of latch 971 are also connected to the light emitting diode display 726 for indicating the level of water selected in the bath function. Output 972C of latch 972 is applied to input 972B of latch 972. The output 972C is also applied to a seven-segment decoder-driver 981 for driving a display 981A of the temperature display 708. The output 972D of latch 972 is applied to a second seven-segment decoder driver 982 for driving a display 982A. The output 972D of latch 972 is also applied to input 973A of latch 973. The output 973C of latch 973 is connected to a third seven-segment decoder-driver 983 for driving display 983A. The output 973C is also applied to the input 973B as heretofore described. The output 973D of latch 973 is connected to the display 730 shown in FIG. 42 as well as being applied to the input 974A of latch 974. The output 974C is connected to the input 974B of latch 974. The outputs 974C and 974D are connected to the indicator 716 for indicating the flow rate selected by the operator. Output 974D of latch 974 is connected to input 975A of latch 975 with the output 975C being connected to the input 975B. The output 975D of latch 975 is connected by multiple cables 101 to plug P1.

Eight-bit latches 971 - 975 function as four channel shift registers for transferring digital information produced by the output 962 of the central processing unit. Pertinent data is transferred in a manner similar to a shift register to drive the displays 708, 726, 730 and 716 as well as provide input on plug P1 for interrogation by the central processing unit of the status of the switches shown in FIG. 43 through plug P2. Accordingly, the central processing unit sequentially and intermittently drives the displays 708, 716, 726 and 730 in addition to providing signals for the interrogation of the switches shown in FIG. 43. The status of the position of the switches of FIG. 43 are applied to the input 956 of the central processing unit 954. The central processing unit 954 compares the status of the switches of FIG. 43 and the inputs from the analog to digital converter 820 for providing an output on output 958 to input 820B of the analog to digital converter 820. The new output of the analog to digital converter 820 drives an eight-bit latch 990 the output of which is applied through an amplifier 992 to a driver amplifier 994. The output of driver 994 is connected through plug 3 and plug 8 to the power circuit shown in FIG. 46.

The outputs of the driver 994 are applied through plugs P3 and P8 to the electromechanical devices shown in FIG. 46 comprising motor 128, motor 122, solenoid 151A, solenoid 154A, solenoid 134A and solenoid 152A. Each of the electromechanical devices are driven by bidirectional thyristors 1000 - 1007 established across the AC lines 1010 and 1012 upon closing of switch 762. The thyristors 1000 - 1007 are controlled by the opto-isolators 894, 892, 864, 862, 1014, 1016, 1018 and 1020. Input from plug P8 to the respective light emitting diode within the opto-isolator will energize the optically coupled bi-directional thyristor internal to the opto-isolator to gate the respective one of the bi-directional power thyristor 1000 - 1007. The bi-directional power thyristers provide power from A.C. lines 1010 and 1012 to energize the respective electromechanical device.

The output of the eight-bit latch 990 shown in FIG. 44 is also connected to gates 1030 and 1032 for input to one shot multi-vibrators 1034 and 1036. The outputs of the one shot multi-vibrators are connected through transistors 1038 and 1040 and plugs P3 and P8 to drive diodes 1041, 1042, 1043 and 1044. Diodes 1041, 1042, 1043 and 1044 enable the braking the motors 122 and 128. The use of a braking for motors 122 and 128 eliminates any over shoot or inertia of the motor and valve assembly.

As it has been previously stated, the novel control circuit 44 set forth in FIGS. 1–10 and 43–46 is a programmable system which may be reprogammed to accommodate various applications and variations of the component parts of the liquid dispensing system. Preferably, the central processing unit received instructions from a read only memory (ROM) which should be well known to those skilled in the art. Accordingly, the system may be adapted for expansion or for controlling different sensors and/or valving elements by merely reprogramming the read only memory (ROM) enabling a single control circuit 44 to be adapted to a wide variety of applications and installations of the dispensing system. In addition, the particular types of circuits associated with the central processing unit has been shown with specific sensors and actuators but it should be understood that the programmable read only memory will enable the substitution of a wide variety of sensors and actuators.

The electronic circuit fundamentally operates through the central processing unit by sequentially interrogating the status of the switches of the display and control panel 100 to indicate the desired functions and levels. The central processing unit also receives sensory information from the sensors shown in FIG. 45 to indicate the actual status of the functions and levels of the dispensing system. The central processing unit also receives information as to the actual status of the control devices shown in FIG. 46. The basic information received from the switch panel, the sensors and the control devices are considered by the central processing unit based on priorities, conditions and limitations imposed by the software contained in the read only memory (ROM) to thereby control the position of the control devices shown in FIG. 46 through plugs 3 and 8 as heretofore described. Accordingly, the circuit diagram shown in FIGS. 43–46 represent an electronic circuit being programmed for driving conventionally available valves to provide the system shown in FIG. 5.

Figure 47:
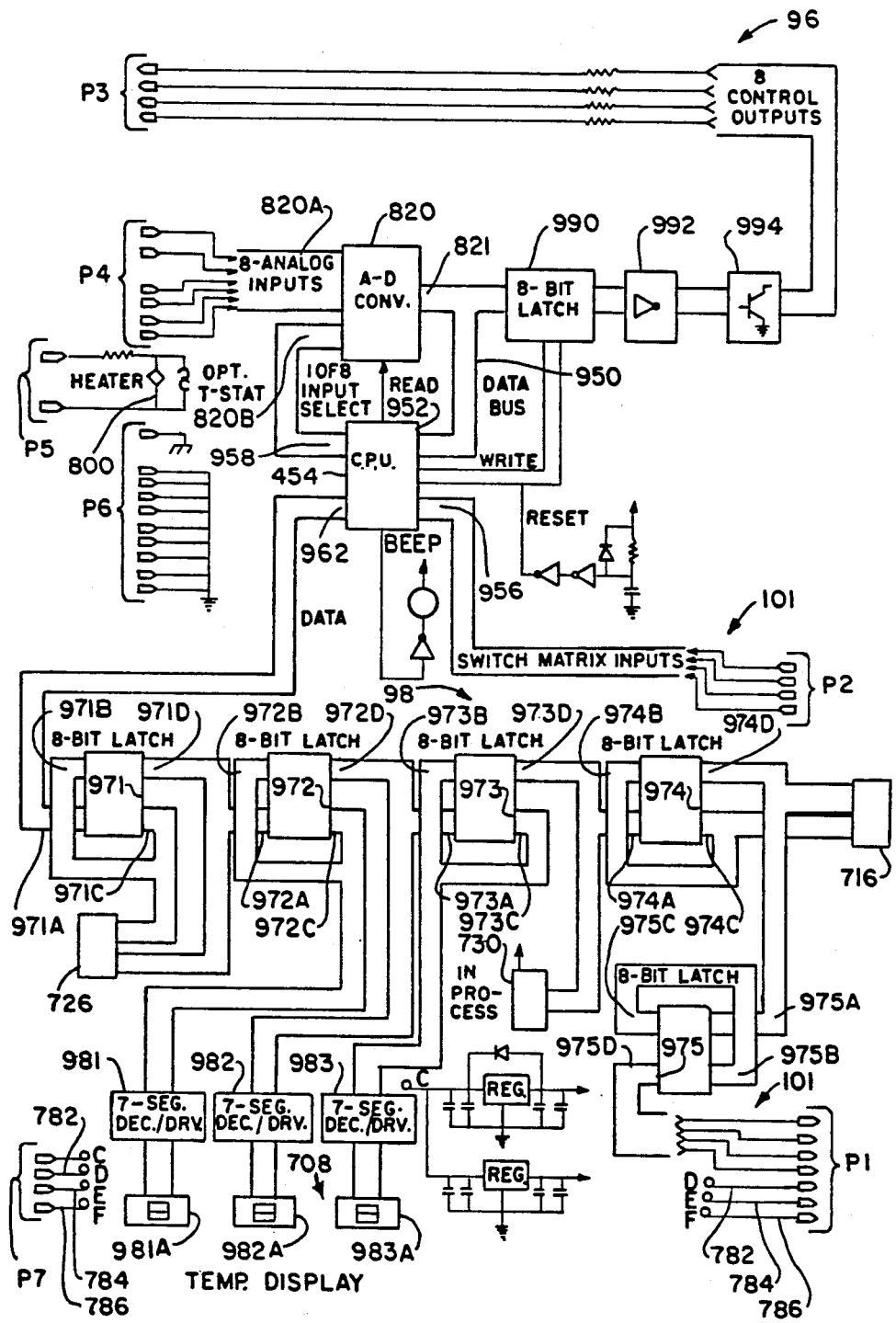
FIG. 47 is a circuit diagram illustrating the central processing unit of FIG. 6.
Figure 48:
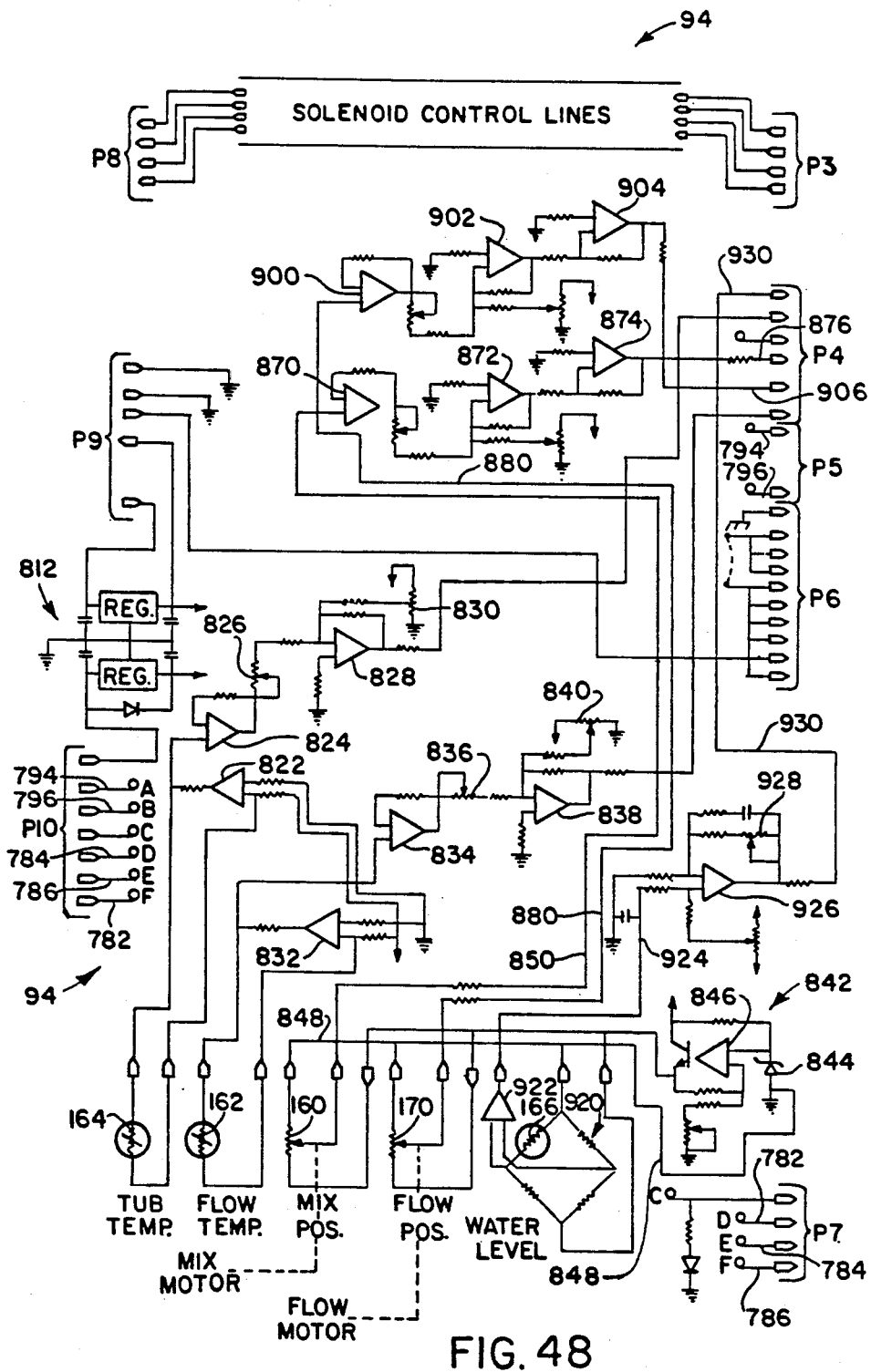
FIG. 48 is a circuit diagram illustrating the analog circuit shown in FIG. 6.
Figure 49:
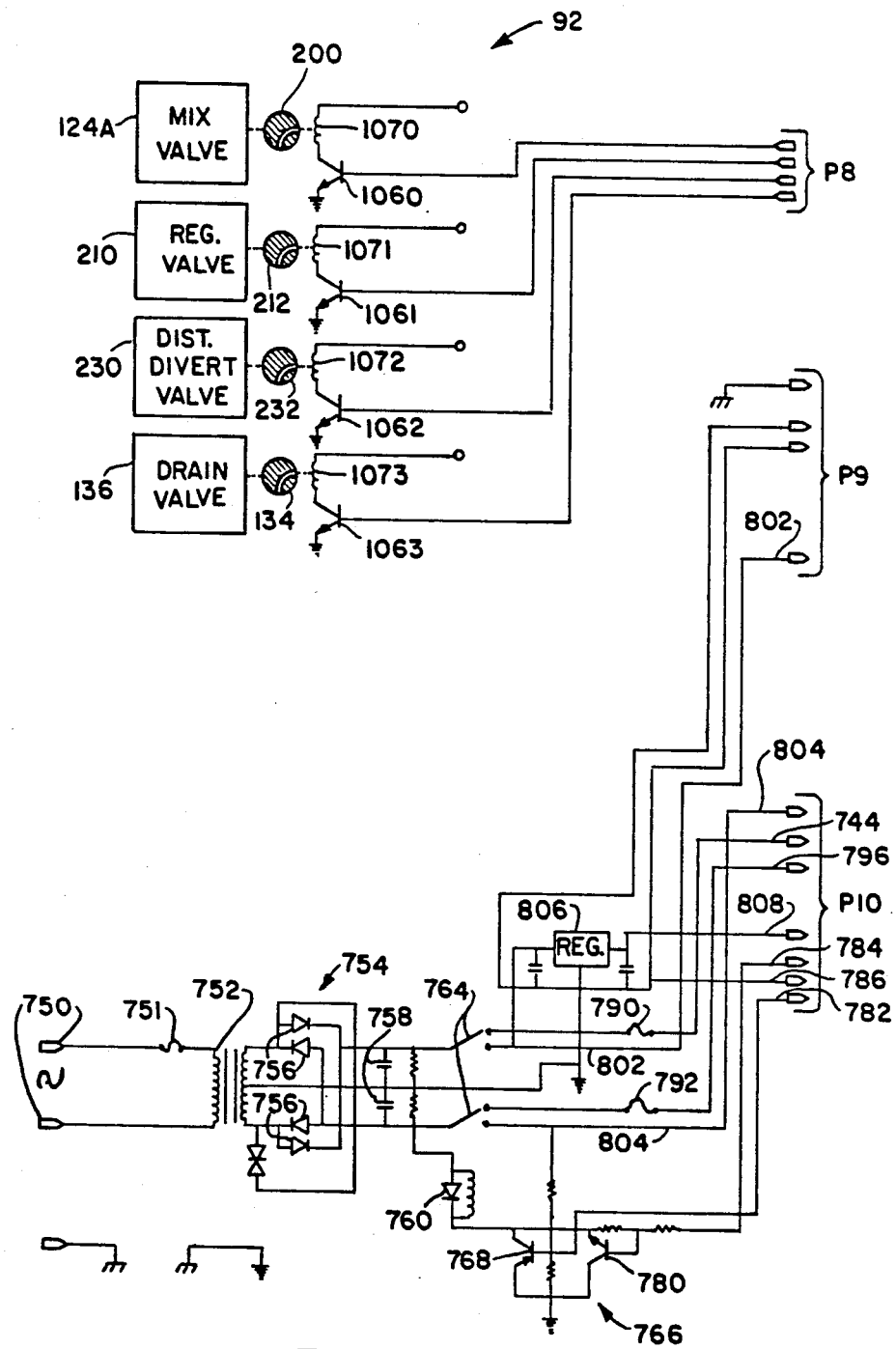
FIG. 49 is a circuit diagram illustrating the power circuit shown in FIG. 6.
Figure 50:
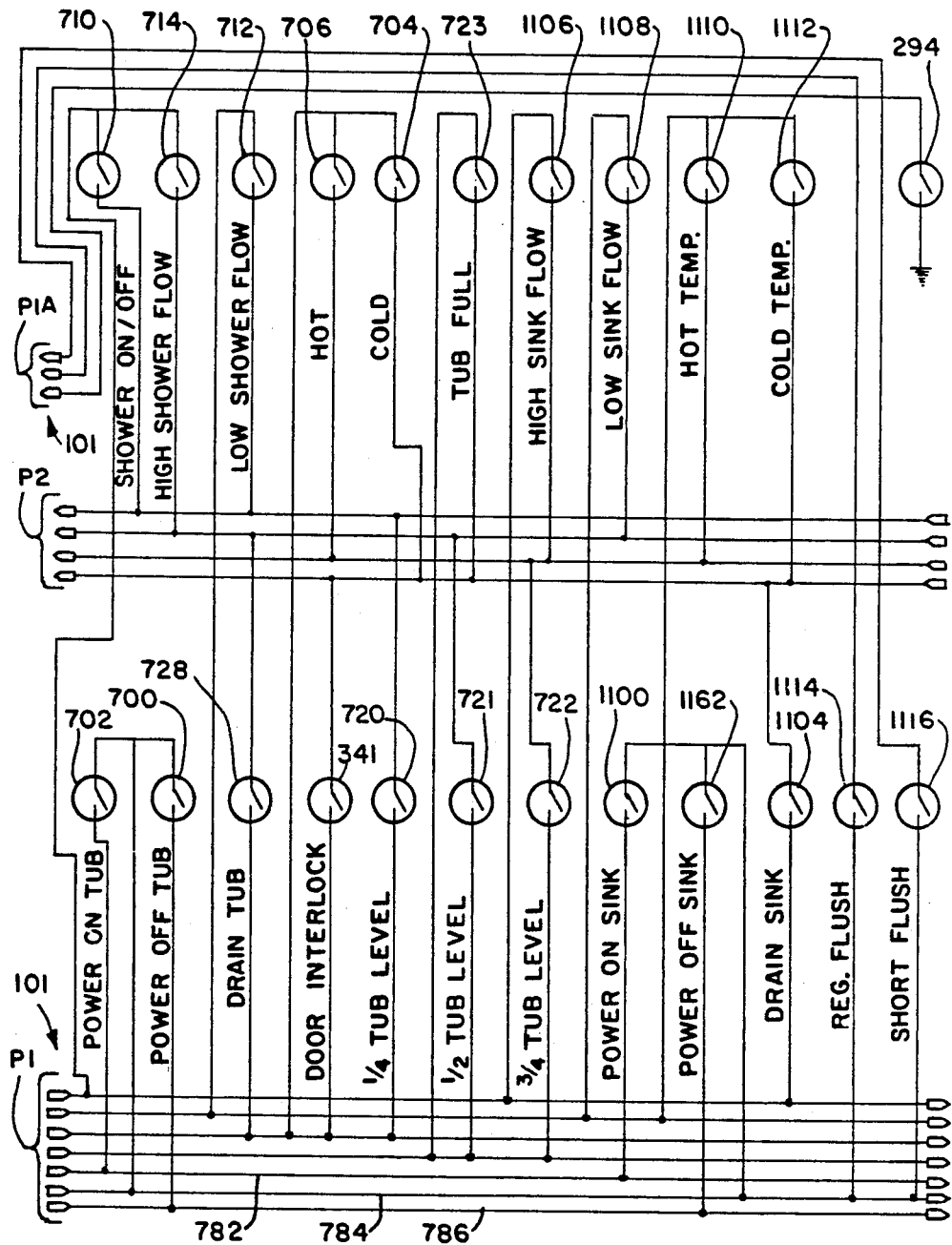
FIG. 50 is a circuit diagram showing the interconnection of the switches of the switch panels of FIG. 10.

The novel electronic circuit disclosed herein may be reprogrammed for use with novel valve means as shown in FIGS. 6 and 16–26. The system shown in FIG. 6 incorporates an identical display and control board 100 as shown in FIG. 32. However, the central processing unit circuit 96 shown in FIGS. 47, the analog circuit 94 shown in FIG. 48 and the power control circuit 92 shown in FIG. 49 is substantially simplified by virtue of the novel valve assembly set forth in FIGS. 16–26. In the central processing unit 96 shown in FIG. 47, the novel valve shown in FIGS. 6 and 16–26 eliminates the need for the electrical brakes for the motors 122 and 128 shown in FIG. 46 comprising gates 1030, 1032, one shot multi-vibrators 1034, 1036 and transistors 1038 and 1040 shown in FIG. 44. The remainder of the central processing unit 96 and the display circuit 98 shown in FIG. 47 functions in a manner similar to the central processing unit 96 and the display circuit shown in FIG. 44. The analog circuit shown in FIGS. 6 and 48 is also simplified by the introduction of the novel valve assembly FIGS. 16–26. In this arrangement, the limit comparator 851, 852, 881 and 882 and the associated circuitry is eliminated by the incorporation of the novel valve assembly. The remainder of the analog circuit shown in FIG. 48 functions in a manner similar to the analog circuit shown in FIG. 45.

FIG. 49 illustrates the power circuit for driving the mixing valve 124A, the regulator valve 210, the divert distribution and divert valve 230 and the drain valve 136. The power circuit 92 for the system shown in FIG. 6 has again been simplified through the incorporation of the novel valve assembly as set forth in FIGS. 16–26. As it can be clearly seen from FIG. 49, the array of opto-isolators and bi-directional thyristers have been eliminated in addition to the elimination of the conventional AC line voltage being disposed in proximity to the bath and shower function. The pilot valves 200, 212, 232 and 134 are shown being respectively operated by solenoid 1070 - 1073 which are controlled by transistors 1060 - 1063. The bases of transistors 1060 - 1063 are connected through plugs P8 and P3 to the driver 994 in FIG. 47. The transistors 1060 and 1063 are shown as power transistors in a represntative form and it should be appreciated that various types of power circuits may be incorporated for controlling pilot valves 200, 212, 232 and 134. Preferably the pilot valves 200, 212, 232 and 134 are biased into the position shown in FIG. 6. Upon activation of a selected one of the power transistors 1060 - 1063, the pilot valves will be moved to a position opposite to that shown in FIG. 6 to activate the respective one of valves 124A, 210, 230 and 136. Since valves 124A, 210, 230 and 136 are also spring biased, only three-way valves are required in contrast to the pilot valves shown in FIGS. 7–10. It should also be appreciated by those skilled in the art that the power transistors 1060 and 1061 may be activated for a limited period of time to properly adjust the mix and regulation valve as should be clear from the explanation of the operation of the system.

FIGS. 50–54 illustrate in greater detail the control circuit shown in FIG. 10. In this example, the central processing unit has been reprogrammed to provide control to the bath function 30, the shower function 34, the toilet function 35 and the sink function 31. In this example, the control and display panels 100, 100A and 100B shown in FIG. 10 are illustrated as a switching matrix in FIG. 50. In addition to the switches shown in FIG. 43, the switching matrix also includes a power ON sink switch 1100, a power OFF sink switch 1102, a sink drain switch 1104, a high sink flow switch 1106, a low sink flow rate switch 1108, a hot temperature sink switch 1110 and a cold temperature switch 1112. Switches 1100, 1102, 1104, 1106, 1108, 1110, and 1112 correspond respectively to switches 702, 700, 728, 714, 712, 706 and 704 for the bath and shower function shown in FIG. 43. Additionally, switch matrix includes switches 1114 and 1116 to provide the flush cycles for the toilet function 35. Switch 294 senses the level and the recovery tank 280 as shown in FIGS. 11 and 12 to control distribution valve 15 or venturi valve 15A shown in FIGS. 11 and 12 as heretofore described. Switch 280 is connected through connector P1A to the central processing unit 956. Switches 1114 and 1116 are connected through a flush latch logic 1122 to the central processing unit 956. Switch 1114 controls a normal flush cycle for flushing solid material whereas switch 1116 controls a short water cycle for flushing liquid waste material.

Figure 51:
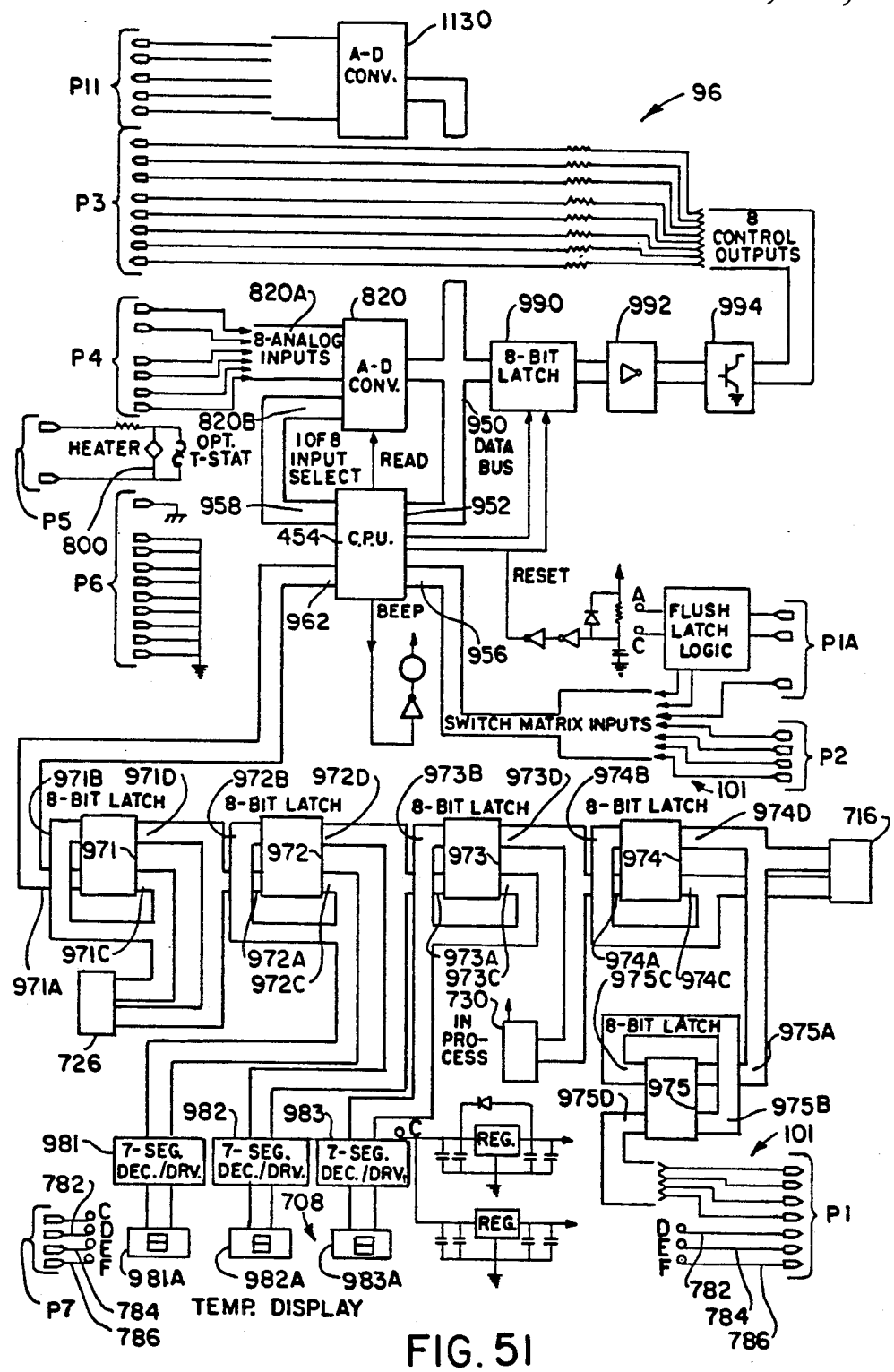
FIG. 51 is a circuit diagram illustrating the central processing unit shown in FIG. 10.
Figure 52:
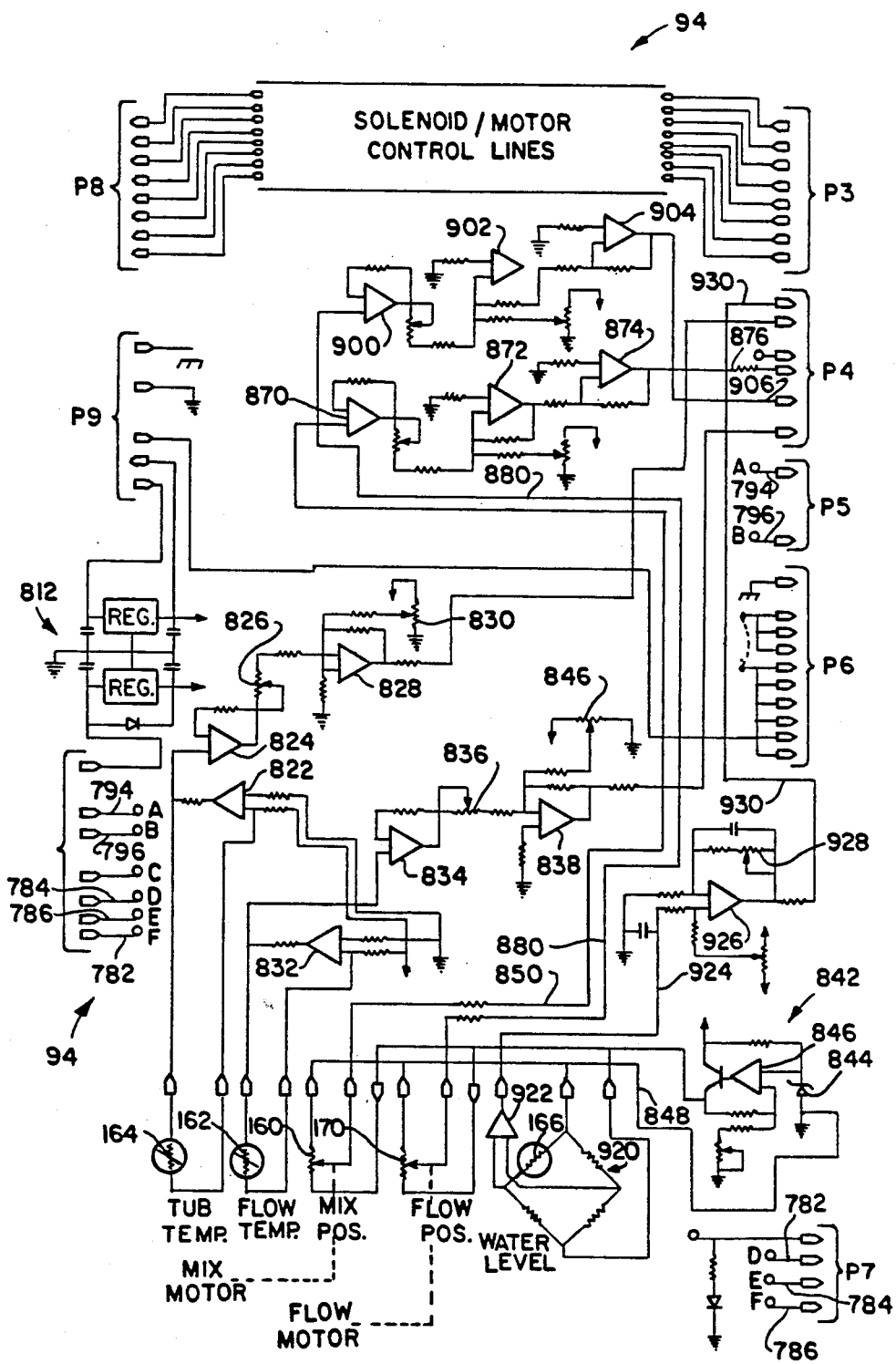
FIG. 52 is a circuit diagram illustrating the bathtub analog circuit shown in FIG. 10.
Figure 53:
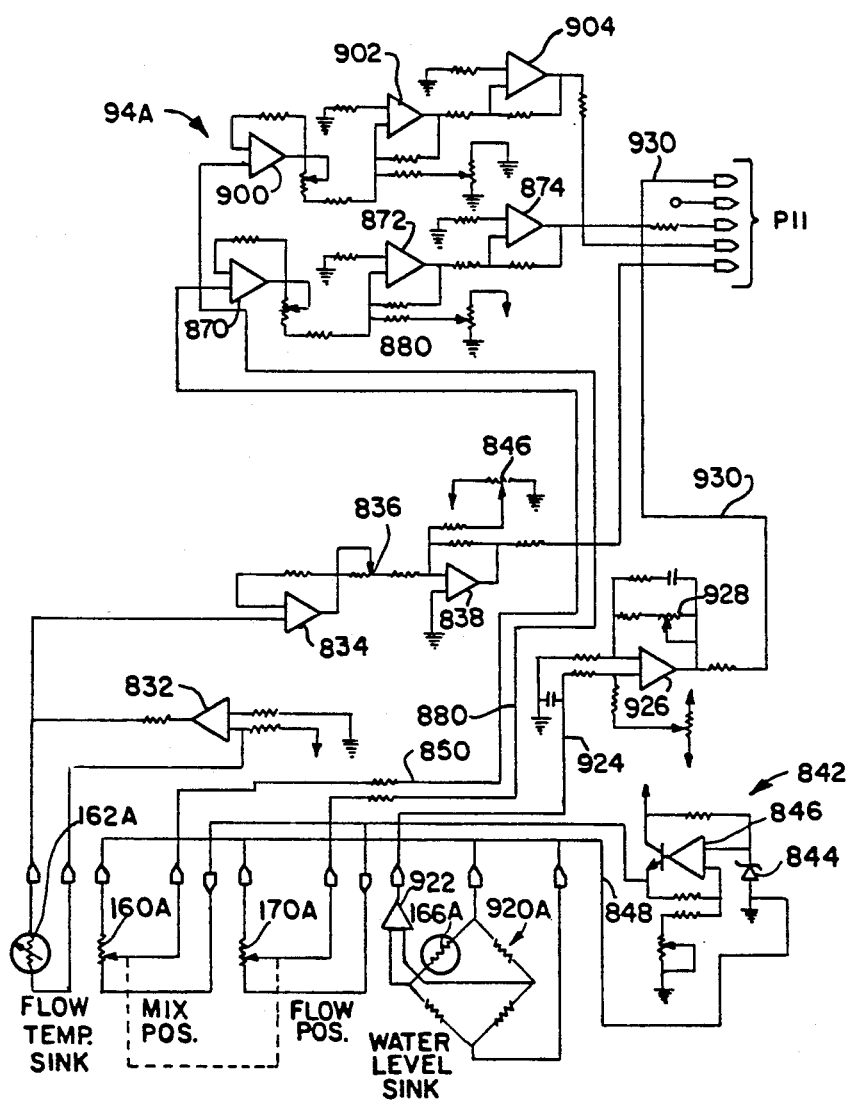
FIG. 53 is a circuit diagram illustrating the sink analog circuit for FIG. 10.
Figure 54:
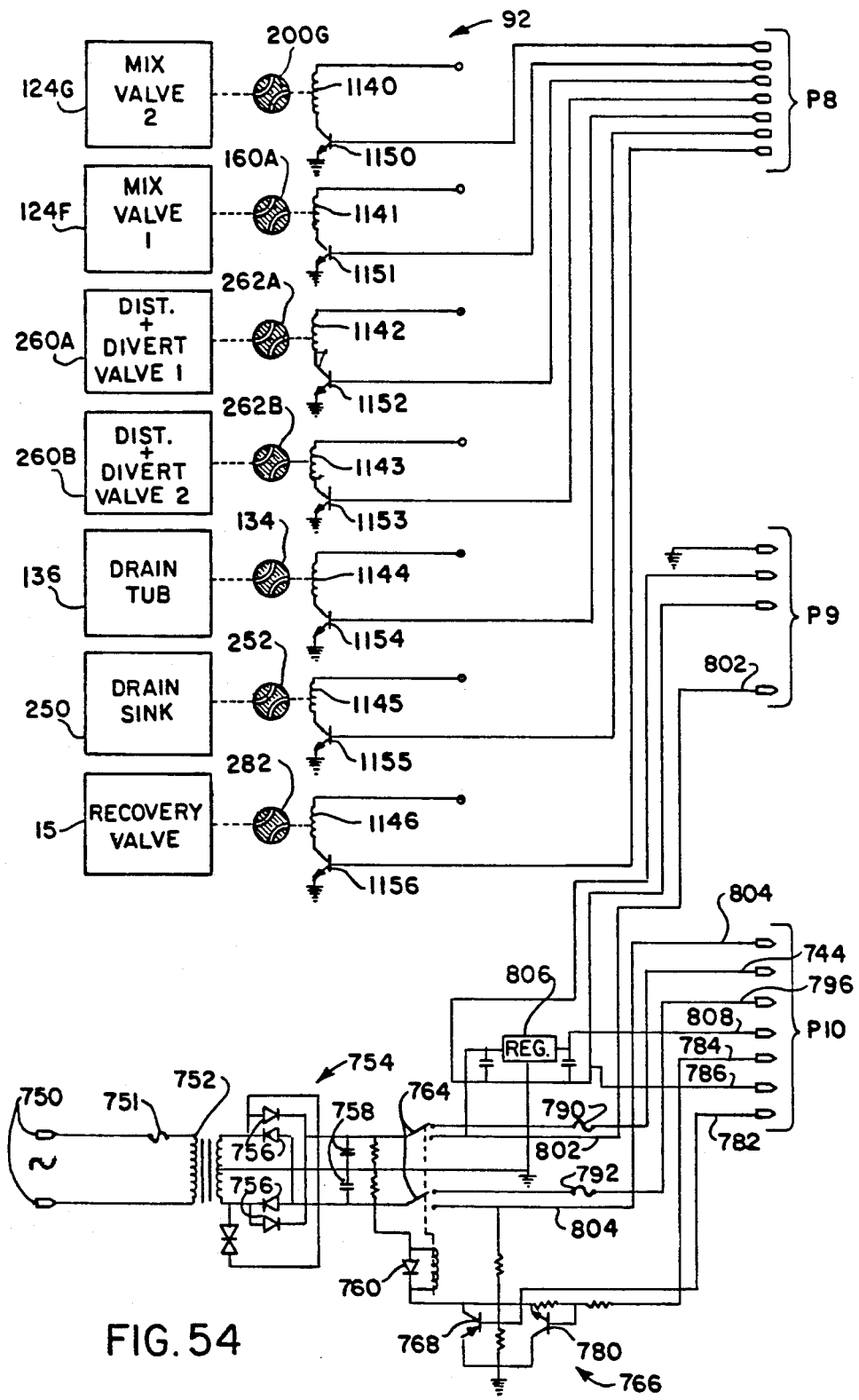
FIG. 54 is a circuit diagram illustrating the power circuit shown in FIG. 10.

A second analog to digital converter 1130 shown in FIG. 51 supplements analog to digital converter 820 for interconnecting the sink function sensor shown in FIG. 53. Plug P3, P4, P5 and P6 interconnects with the analog circuit shown in FIG. 52 which is identical to the analog to digital circuit shown in FIG. 48 which has been previously described.

The analog circuit 94A shown in FIG. 53 is similar to the analog circuit shown in FIG. 52. In this embodiment, a sink flow temperature sensor 162A, a mix position sensor 160A, a flow position sensor 170A, and water level sensor 166A in a bridge 920A are connected through amplifiers to plug P11 in a similar manner to FIGS. 52. Plug P11 is connected to the supplementary analog to digital converter 1130. As it can be clearly seen from FIG. 53, the addition of other functions to the system merely require a supplemental analog circuit such as circuit 94A and a supplemental analog to digital converter 1130 as shown in FIG. 51 to provide input to the central processing unit 954. The output of the central processing unit shown in FIG. 51 is again applied through plugs P3 and P8 to the power circuit shown in FIG. 54. The power circuit of FIG. 4 operates in a similar manner with pilot valve 200G, 160A, 262A, 262B, 134, 256 and 282 respectively, controlling valves 124G, 124F, 268, 260B, 136, 250 and 15 respectively which are also shown in FIG. 10. The four-way pilot valve 200G, 160A, 262A, 262B, 134, 252 and 282 are controlled respectively by solenoids 1140 - 1146 which are operated by transistors 1150 - 1156. In this embodiment, the pilot valves 200G, 160A, 262A, 262B, 134, 252 and 282 are again into the position as shown in FIG. 10 with activation of a selection one of transistors 1150 - 1156 through signals on plug P8 causing the selected valve to move in the position to that opposite shown in FIG. 10.

As it can be readily seen from the foregoing specification and drawings, the present system discloses a novel electronic circuit which is capable of expansion to operate the entire bathroom function as well and an entire house or a building complex. Furthermore, the incorporation of the hydraulically operated valves shown in FIGS. 16–42 simplify the electrical actuators required in the liquid dispensing system.

The liquid dispensing system as heretofore described not only provides a safe and convenient means of distributing liquids such as water in a household or a building complex, but also substantially reduces the quantity of liquid or water normally wasted in a conventional liquid distribution system. The present system is believed to meet the needs of the future and the predicted shortages of water throughout the world.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention.

What is claimed is:

1. A mixing valve for mixing a first liquid with a second liquid and for distributing a mixture of the first and the second liquids into one of a plurality of distribution outputs, comprising in combination:

valve body means having a longitudinally extending internal cavity;

a first plurality of input apertures for introducing the first liquid into said internal cavity of said valve body means;

a second plurality of input apertures for introducing the second liquid into said internal cavity of said valve body means;

a first distribution output communicating with said internal cavity of said valve body means;

a second distribution output communicating with said internal cavity of said valve body means;

said first distribution output being located remote from said second distribution output within said internal cavity of said valve body means for enabling selective discharge of liquid from one of said first and second distribution outputs;

a reciprocal valve means disposed within said internal cavity of said valve body means;

said reciprocal valve means having only one piston including a piston channel;

a first of said first plurality of input apertures and a first of said second plurality of input apertures and said first distribution output being located relative to said internal cavity of said valve body means for enabling the flow of at least one of the first and second liquids from at least one of said first of said first plurality of input apertures and said first of said second plurality of input apertures through said piston channel to said first distribution output when said piston is in a first position;

a second of said first plurality of input apertures and a second of said second plurality of input apertures and said second distribution output being located relative to said internal cavity of said valve body means for enabling the flow of at least one of the first and second liquids from at least one of said second of said first plurality of input apertures and said second of said second plurality of input apertures through said piston channel to said second distribution output when said piston is in a second position;

said first of said first plurality of input apertures being displaced a selective axial distance from first of said second plurality of input apertures for enabling proportional introduction of the first and second liquids from said first of said first plurality of input apertures and said first of said second plurality of input apertures and through said piston channel to said first distribution output when said piston is moved proximate said first position;

said second of said first plurality of input apertures being displaced a selective distance from said second of said second plurality of input apertures for enabling proportional introduction of the first and second liquids from said second of said first plurality of input apertures and said second of said second plurality of input apertures and through said piston channel to said second distribution output when said piston is moved proximate said second position; and means for reciprocating said piston within said internal cavity of said valve body means for enabling a selected mixture of the first and second liquids to be discharged for one of said first and second distribution outputs.

2. A mixing valve as set forth in claim 1, including motive means for longitudinally moving said reciprocal valve means.

3. A mixing valve as set forth in claims 2, wherein said motive means includes an electric motor.

4. A mixing valve as set forth in claim 2, wherein said motive means includes fluid operated motive means.

5. A mixing valve as set forth in claim 4, wherein said fluid operated motive means is hydraulic motive means.

6. A mixing valve as set forth in claim 4, wherein said fluid operated motive means is pneumatic motive means.

7. A mixing valve as set forth in claim 1, including position sensor means for sensing the position of said reciprocal valve means.

8. a mixing valve for mixing a first liquid with a second liquid and for distributing a mixture of the first and the second liquids into one of a plurality of distribution outputs, comprising in combination:

valve body means having a longitudinally extending internal cavity;

a plurality of first input apertures for introducing the first liquid into said internal cavity of said valve body means;

a plurality of second input apertures for introducing the second liquid into said internal cavity of said valve body means;

a first distribution output communicating with said internal cavity of said valve body means;

a second distribution output communicating with said internal cavity of said valve body means;

said first distribution output being located remote from said second distribution output within said internal cavity of said valve body means for enabling selective discharge of liquid from one of said first and second distribution outputs;

a reciprocal valve means disposed within said internal cavity of said valve body means;

said reciprocal valve means having piston including a piston channel;

one of said first input apertures and one of said second input apertures and said first distribution output being located relative to said internal cavity of said valve body means for enabling the flow of the first and second liquids from said one of said first and second input apertures through said piston channel to said first distribution output when said piston is in a first position;

another of said first input apertures and another of said second input apertures and said second distribution output being located relative to said internal cavity of said valve body means for enabling the flow of the first and second liquids from said another first and second input apertures through said piston channel to said second distribution output when said piston is in a second position;

said first input apertures being respectively displaced a selective axial distance from said second input apertures for enabling proportional introduction of the first and second liquids from said first input apertures and said second input apertures and through said piston channel to one of said first and second distribution outputs when said piston is moved proximate said first and second position, respectively; and means for reciprocating said piston within said internal cavity of said valve body means for enabling a selected mixture of the first and second liquids to be discharged for one of said first and second distribution outputs.

* * * * *